United States Patent
Sato et al.

(10) Patent No.: US 6,882,502 B2
(45) Date of Patent: Apr. 19, 2005

(54) THIN-FILM MAGNETIC HEAD WITH NARROWED TRACK WIDTH AND METHOD FOR MAKING SAME

(75) Inventors: Kiyoshi Sato, Niigata-ken (JP); Hideki Gochou, Niigata-ken (JP); Hisayuki Yazawa, Niigata-ken (JP); Kiyoshi Kobayashi, Niigata-ken (JP); Akira Koyama, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 386 days.

(21) Appl. No.: 10/017,748

(22) Filed: Dec. 14, 2001

(65) Prior Publication Data

US 2002/0080522 A1 Jun. 27, 2002

(30) Foreign Application Priority Data

Dec. 26, 2000 (JP) .................................... 2000-398949

(51) Int. Cl.⁷ .............................................. G11B 5/147
(52) U.S. Cl. ...................................... 360/119; 360/126
(58) Field of Search ................................ 360/119, 126

(56) References Cited

U.S. PATENT DOCUMENTS

| | | | |
|---|---|---|---|
| 4,819,112 A | | 4/1989 | Iwata et al. |
| 5,652,687 A | * | 7/1997 | Chen et al. ............. 360/126 |
| 5,805,391 A | * | 9/1998 | Chang et al. ............ 360/317 |
| 5,828,533 A | | 10/1998 | Ohashi et al. |
| 6,134,080 A | | 10/2000 | Chang et al. |
| 6,369,984 B1 | * | 4/2002 | Sato ...................... 360/126 |
| 6,430,003 B1 | * | 8/2002 | Sasaki ................... 360/126 |
| 6,459,542 B1 | * | 10/2002 | Sato ...................... 360/126 |
| 6,594,112 B1 | * | 7/2003 | Crue et al. .............. 360/126 |
| 6,738,223 B1 | * | 5/2004 | Sato et al. .............. 360/126 |
| 6,801,392 B1 | * | 10/2004 | Kawasaki et al. ........ 360/126 |

FOREIGN PATENT DOCUMENTS

| | | |
|---|---|---|
| JP | 11-306511 | 11/1999 |
| JP | 2000-353304 | 12/2000 |

* cited by examiner

*Primary Examiner*—Brian E. Miller
(74) *Attorney, Agent, or Firm*—Brinks Hofer Gilson & Lione

(57) ABSTRACT

A thin-film magnetic head includes a lower core layer, a gap layer formed on the lower core layer with a lower pole layer therebetween, an upper pole layer formed on the gap layer, an upper core layer formed on the upper pole layer, and a Gd-defining layer for defining the depth in the height direction of the joint surface between the gap layer and the upper pole layer. The width in the track width direction of the gap layer is smaller than or equal to the width in the track width direction of the upper pole layer when viewed from the surface facing the recording medium. By employing such a thin-film magnetic head, the width in the track width direction of the gap layer can be decreased, and thus track narrowing is achieved.

6 Claims, 17 Drawing Sheets

THIN-FILM MAGNETIC HEAD WITH NARROWED TRACK WIDTH AND METHOD FOR MAKING SAME

BACKGROUND OF THE INVENTION

1. Field of the Invention

The present invention relates to thin-film magnetic heads, for example, used as floating type magnetic heads and contact type magnetic heads. More particularly, the invention relates to a thin-film magnetic head which is suitable for track width narrowing, and to a method for making the same.

2. Description of the Related Art

FIG. 24 is a partial front view of a conventional thin-film magnetic head 21 viewed from a surface facing a medium (air bearing surface: ABS), and FIG. 25 is a partial sectional view taken along the line XXV—XXV of FIG. 24.

A lower core layer 22 shown in FIGS. 24 and 25 is composed of a soft magnetic alloy, such as an Fe—Ni alloy (Permalloy). An insulating layer (not shown in the drawing) is formed at both sides in the track width direction (in the direction of the X-axis) of the lower core layer 22.

As shown in FIG. 24, a lower pole layer 25, a gap layer 26, and an upper pole layer 27, which constitute a pole section 28, are deposited on the lower core layer 22. The pole section 28 writes information into a medium by a leakage magnetic field from a magnetic gap G with a track width Tw1. As shown in FIG. 25, the pole section 28 extends from a surface 33 facing the medium in the height direction (in the Y direction in the drawing), which may be also referred to as the depth direction of the thin-film magnetic head, to a gap depth (Gd) defining layer (hereinafter referred to as a Gd-defining layer) 23 which will be described below. The lower pole layer 25 and the upper pole layer 27 are composed of a soft magnetic alloy, such as an Fe—Ni alloy (Permalloy), and the gap layer 26 is composed of a nonmagnetic material, such as alumina or an NiP alloy.

The Gd-defining layer 23, which is formed on the lower core layer 22 toward the back from the surface 33 facing the medium, is composed of a nonmagnetic material, such as a resist. As described above, since the pole section 28 extends from the surface 33 facing the medium to the Gd-defining layer 23 in the height direction, a distance from the surface 33 facing the medium to the end of the joint surface between the upper pole layer 27 and the gap layer 26 is defined as the gap depth Gd. As shown in FIG. 25, the Gd-defining layer 23 has a curved surface. In FIG. 24, a broken line indicates the shape of the Gd-defining layer 23 extending from both sides of the pole section 28 in the track width direction.

As shown in FIG. 25, a connecting point lifting layer 29 composed of a soft magnetic alloy, such as an Fe—Ni alloy (Permalloy), is formed on the lower core layer 22 toward the back from the Gd-defining layer 23. As shown in FIGS. 24 and 25, an insulating layer 24 composed of alumina or the like is formed at both sides in the track width direction and at the back in the height direction of the pole section 28, and around the connecting point lifting layer 29. A coil layer 30 is spirally formed on the insulating layer 24, and an insulating layer 31 composed of an organic insulating material or the like is formed so as to cover the coil layer 30.

An upper core layer 32 which is composed of a soft magnetic alloy, such as an Fe—Ni alloy (Permalloy) is, for example, formed by frame plating. A front end 32a of the upper core layer 32 is magnetically coupled to the upper pole layer 27 and is exposed at the surface 33 facing the medium.

A base 32b of the upper core layer 32 is magnetically coupled to the lower core layer 22 through the connecting point lifting layer 29. The upper core layer 32 is covered by an insulating layer (not shown in the drawing).

The thin-film magnetic head 21 is, for example, used as a floating type magnetic head, and is built in a magnetic disk unit. When a recording current is applied to the coil layer 30, a recording magnetic field is induced in the upper and lower cores 32 and 22 and also in the upper and lower pole layers 27 and 25 magnetically coupled thereto, and a leakage magnetic field from the magnetic gap G at the surface 33 facing the medium enables writing of information into a magnetic disk which is a magnetic recording medium rotating in the Z direction.

In order to fabricate the thin-film magnetic head 21, first, the Gd-defining layer 23 is formed on the lower core layer 22 at a position receding in the Y direction from the surface 33 facing the medium. Next, as shown in FIG. 26, a resist layer 34 is applied to the lower core layer 22 so as to cover the Gd-defining layer 23, and a recess 34a extending to the Gd-defining layer 23 and a hole corresponding to the connecting point lifting layer 29 are made in the resist layer 34 using photolithography. Additionally, the Gd-defining layer 23 has a curved surface, and each of extending sections 23a and 23b of the Gd-defining layer 23 extending from both sides of the pole section 28 has, for example, a length of approximately 9 $\mu$m.

Next, as shown in FIG. 27, a laminate (pole section) 28 is formed by continuously plating the lower pole layer 25, the gap layer 26, and the upper pole layer 27 in the recess 34a using electrolytic plating, and the connecting point lifting layer 29 shown in FIG. 25 is also formed in the hole by electrolytic plating.

As shown in FIG. 31, the insulating layer 24 is then formed on the lower core layer 22 so as to cover the pole section 28 and the connecting point lifting layer 29, and the insulating layer 24 is planarized by performing chemical mechanical polishing (CMP) to the line C—C. Next, as shown in FIG. 32, the coil layer 30 is formed on the planarized insulating layer 24 by combining sputtering, electrolytic plating, and photolithography.

The insulating layer 31 is formed on the insulating layer 24, and the upper core layer 32 is formed on the insulating layer 31 by patterning using frame plating or the like. The fabrication of the major part of the conventional thin-film magnetic head 21 shown in FIGS. 24 and 25 is thereby completed.

In the thin-film magnetic head 21 described above, since the upper pole layer 27 can be formed separately from the upper core layer 32, a narrower track width can be achieved compared to a thin-film magnetic head not provided with an upper pole layer. Since the Gd defining insulation layer is formed, a predetermined gap depth can be defined accurately.

As the density and capacity of the magnetic disk unit are increased, further track narrowing is required in the thin-film magnetic head. The track width Tw1 is determined by the width in the track width direction (in the direction of the X-axis in the drawing) of the gap layer 26. In order to meet the requirement for further gap narrowing, the width of the entire pole section 28 must be decreased. In order to decrease the width of the entire pole section 28, the width T of the recess 34a for forming the pole section 28 must be decreased.

However, if the width T of the recess 34a for forming the pole section 28 is decreased excessively, resolution by photolithography is extremely degraded and the recess 34*a* cannot be formed with high accuracy. For example, the width T of the recess 34*a* must be approximately 0.5 μm to allow the accurate formation of the recess 34*a* by photolithography.

In order to make the track width Tw1 of the pole section 28 smaller than the width which can be obtained with high accuracy by photolithography, a method is known in which after the pole section 28 is formed, the sides of the pole section 28 are physically (or chemically) etched. That is, as shown in FIG. 27, the resist layer 34 is removed after the pole section 28 is formed, and then, as shown in FIG. 28, sides 28*a* and 28*b* of the pole section 28 are etched by ion milling or the like in slanting directions (in the A and B directions in the drawing) to decrease the track width Tw1. FIG. 30 shows a state in which both sides of the pole section 28 have been etched.

However, if a decrease of the track width Tw1 to less than 0.4 μm is attempted by etching the sides 28*a* and 28*b* using ion milling, the track width Tw1 in the track width direction of the gap layer 26 does not become smallest and, as shown in FIG. 33, the width in the track width direction of the upper pole layer 27 formed on the gap layer 26 becomes smallest. Such a phenomenon is presumed to be caused because the extending sections 23*a* and 23*b* of the Gd-defining layer 23 which extend from both sides of the pole layer 28 shadow the lower part of the pole section 28, and irradiated ions do not spread sufficiently to the gap layer 26 and the lower pole layer 25 in the pole section 28. If the width in the track width direction of the upper pole layer 27 is smaller than the width in the track width direction of the gap layer 26, the recording magnetic field guided to the upper pole layer 27 from the upper core layer 32 cannot be concentrated in the magnetic gap G, resulting in a problem in the overwrite characteristic. Magnetic leakage also occurs at the narrowest part of the pole section 28, that is, at the narrowest part of the upper pole layer 27, which may result in write fringing.

SUMMARY OF THE INVENTION

Objects of the present invention are to provide a thin-film magnetic head in which the width in the track width direction of a gap layer can be decreased and track narrowing is achieved, and to provide a method for making the same.

In one aspect of the present invention, a thin-film magnetic head includes a lower core layer, a gap layer formed on the lower core layer, optionally with a lower pole layer therebetween; an upper pole layer formed on the gap layer; an upper core layer formed on the upper pole layer; and a Gd-defining layer for defining the depth in the height direction of the joint surface between the gap layer and the upper pole layer, the Gd-defining layer being formed on the lower core layer toward the back in the height direction from a surface facing a recording medium. The width in the track width direction of the gap layer is smaller than or equal to the width in the track width direction of the upper pole layer when viewed from the surface facing the recording medium.

In the thin-film magnetic head of the present invention, since the upper pole layer and the upper core layer are separately formed, a pole section including the gap layer formed on the lower core layer and the upper pole layer formed on the gap layer or including the lower pole layer formed on the lower core layer, the gap layer formed on the lower pole layer, and the upper pole layer formed on the gap layer can be formed with high accuracy even if the width is narrowed. Since the Gd-defining layer is provided in the thin-film magnetic head, a predetermined gap depth can be defined accurately.

In the thin-film magnetic head of the present invention, preferably, the width in the track width direction of the gap layer is smaller than or equal to the width in the track width direction of the upper pole layer and the width in the track width direction of the lower pole layer when viewed from the surface facing the recording medium. In the present invention, since the gap layer is formed so as to include a portion with the smallest width in the track width direction of the pole section, it is possible to achieve a track width Tw of 0.4 μm or less, for example, approximately 0.1 to 0.4 μm, which is below the lower limit of the resolution by photolithography, i.e., the resolution of the resist for exposure and development, and thereby high density magnetic recording can be performed. If the width in the track width direction of the gap layer is smaller than or equal to the width in the track width direction of the upper pole layer or is smaller than the width in the track width direction of the upper pole layer, it is possible to concentrate the recording magnetic field guided from the upper core layer to the upper pole layer in the magnetic gap G.

More preferably, the width in the track width direction of the upper pole layer is set so as to gradually increase with distance from the gap layer when viewed from the surface facing the medium.

More preferably, the width in the track width direction of the lower pole layer is set so as to gradually increase with distance from the gap layer, and the width in the track width direction of the upper pole layer is set so as to gradually increase with distance from the gap layer, and also the gap layer includes the portion with the smallest width in the track width direction of the pole section.

The width in the track width direction of the lower pole layer may be set so as to gradually decrease with distance from the gap layer and the width in the track width direction of the upper pole layer may be set so as to gradually increase with distance from the gap layer when viewed from the surface facing the medium.

Preferably, in the thin-film magnetic head of the present invention, the width in the track width direction of the gap layer is smaller than or equal to the width in the track width direction of the upper pole layer, and the width in the track width direction of the lower pole layer is substantially equal to the width in the track width direction of the gap layer when viewed from the surface facing the medium.

Preferably, the width of the lower pole layer is substantially constant in the thickness direction of the lower pole layer and is substantially equal to the width in the track width direction of the gap layer, the width in the track width direction of the upper pole layer is set so as to gradually increase with distance from the gap layer, and the gap layer is arranged as the portion with the smallest width in the track width direction of the pole section when viewed from the surface facing the medium.

In the thin-film magnetic head of the present invention, the minimum width in the track width direction of the gap layer is 0.4 μm or less when viewed from the surface facing the medium.

Consequently, it is possible to achieve a track width Tw of 0.4 μm or less, for example, approximately 0.1 to 0.4 μm, which is below the lower limit of the resolution by photolithography, i.e., the resolution of the resist for exposure and development, and thereby high density magnetic recording can be performed.

In the thin-film magnetic head of the present invention, preferably, the thickness of the lower pole layer is in the range of 0.25 to 0.5 μm. By forming the lower pole layer so as to have a large volume, it is possible to suppress magnetic saturation at high recording densities. Write fringing due to the leakage magnetic field from the upper pole layer to the lower core layer can also be avoided.

In the thin-film magnetic head of the present invention, preferably, the Gd-defining layer extends from both sides of the pole section, and each of the extending section of the Gd-defining layer has a width of 0 to 4 μm.

In another aspect of the present invention, a method for making a thin-film magnetic head includes a step of forming a Gd-defining layer on a lower core layer so as to recede from a surface facing a medium by a gap depth; a step of forming a pole section in which a gap layer is formed on the lower core layer, optionally with a lower pole layer therebetween, and an upper pole layer is formed on the gap layer; and a step of etching for performing dry etching on both sides of the pole section when viewed from the surface facing the medium. In the step of forming the Gd-defining layer, each extending section of the Gd-defining layer extending from either side of the pole section is set so as to have a predetermined width.

In the method for making the thin-film magnetic head of the present invention, the width W of each extending section of the Gd-defining layer can be set at a desired length. In the etching step, since the shadowing effect by the extending sections is suppressed, a track width Tw which is narrower than the lower limit of the resolution by photolithography, i.e., the resolution of the resist for exposure and development, can be achieved.

In the method for making the thin-film magnetic head of the present invention, preferably, the width of each extending section of the Gd-defining layer is set in the range of 0 to 4 μm.

More preferably, the width of each extending section of the Gd-defining layer is set in the range of 1 to 4 μm.

Preferably, the method for making the thin-film magnetic head of the present invention further includes, after the step of forming the pole section, a step of adjusting the width of each extending section of the Gd-defining layer to a predetermined length.

More preferably, in the step of adjusting the width of each extending section of the Gd-defining layer, the width of each extending section is adjusted to the predetermined length by one of reactive ion etching (RIE) and $O_2$ ashing. By forming each extending section of the Gd-defining layer with a width longer than the predetermined width and by adjusting the width by removing the unwanted section later, the predetermined width of the extending section of the Gd-defining layer can be obtained even if the cross section of the Gd-defining layer has any shape.

In the method for making the thin-film magnetic head of the present invention, in the step of forming the pole section, preferably, the lower pole layer, the gap layer, and the upper pole layer are formed by plating in that order.

In the method for making the thin-film magnetic head of the present invention, in the step of forming the pole section, preferably, the gap layer and the upper pole layer are formed in that order.

In the method for making the thin-film magnetic head of the present invention, in the etching step, preferably, the ion irradiation angle is set at 45° to 75° with respect to the perpendicular direction to the lower core layer. By employing the ion irradiation angle θ2, it is possible to decrease the track width without extremely decreasing the thickness of the upper pole layer, and also it is possible to set the upper surface of the lower core layer so as to have predetermined inclined planes.

In the etching step, more preferably, the ion irradiation angle is set at 55° to 70° with respect to the perpendicular direction to the lower core layer.

DESCRIPTION OF THE PREFERRED EMBODIMENTS

The embodiments of the present invention will now be described with reference to FIGS. 1 to 23.

Figure 1:
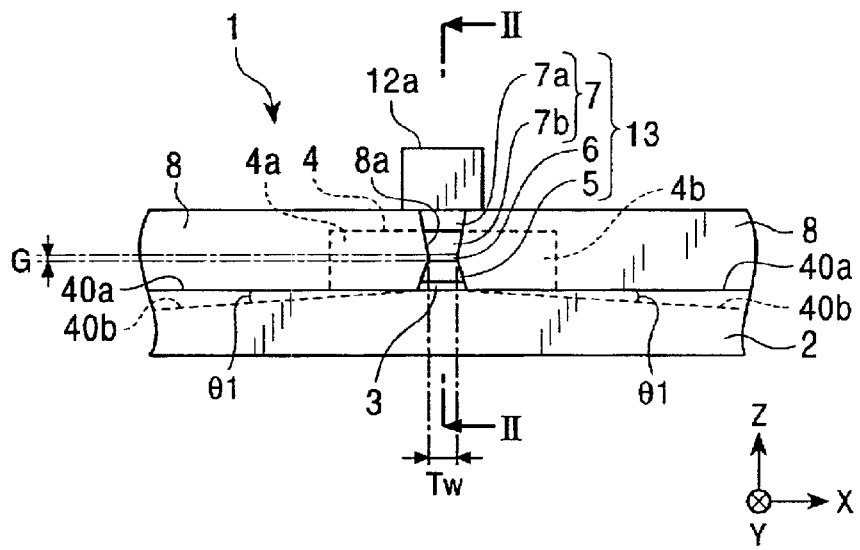
FIG. 1 is a partial front view of a thin-film magnetic head in a first embodiment of the present invention.
Figure 2:
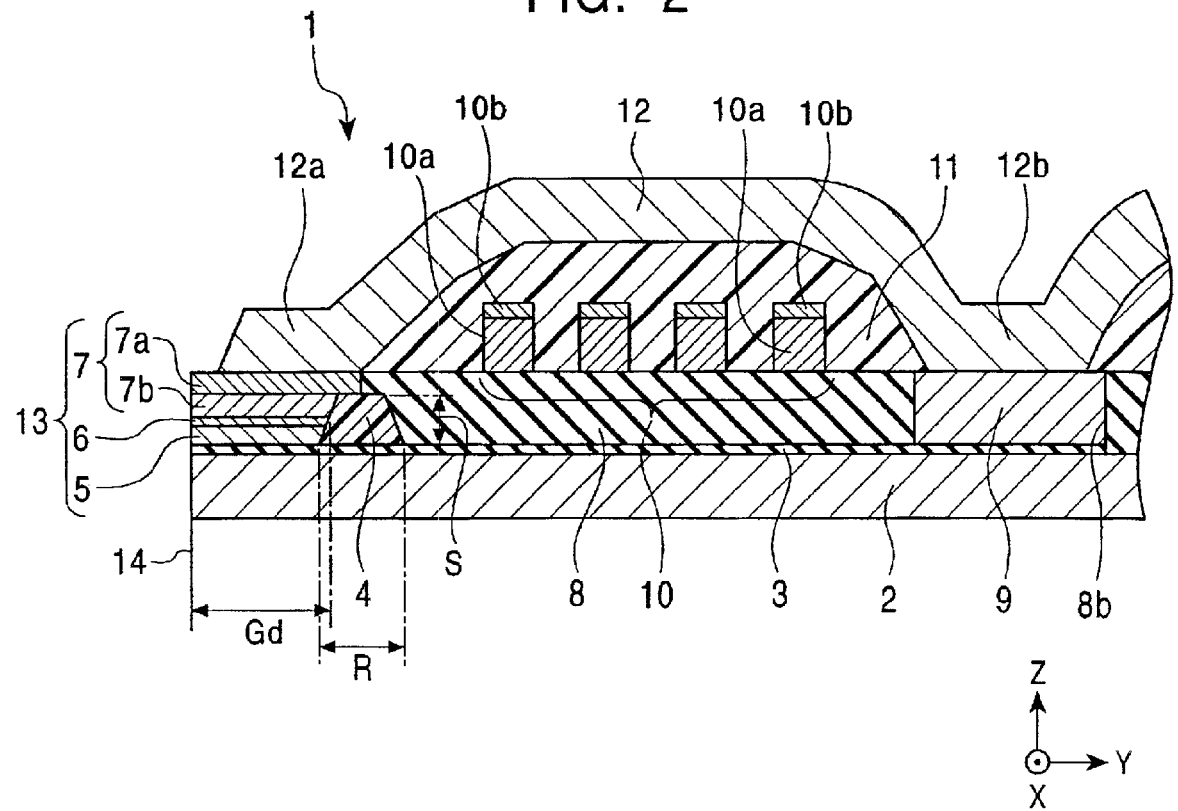
FIG. 2 is a partial sectional view taken along the line II—II of FIG. 1.

FIG. 1 is a partial front view of a thin-film magnetic head (inductive head) 1 in a first embodiment of the present invention, and FIG. 2 is a partial sectional view taken along the line II—II of FIG. 1.

In the present invention, a read head (AMR head, GMR head, TMR head, or the like) using a magnetoresistance effect may be disposed under the inductive head.

A lower core layer 2 shown in FIGS. 1 and 2 is composed of a soft magnetic alloy, such as an FeNi alloy (Permalloy). Additionally, when a read head is disposed under the lower core layer 2, a shield layer for protecting a magnetoresistive element from noise may be provided separately from the lower core layer 2, or the lower core layer 2 may be used as an upper shield layer for the read head without providing the shield layer. Although not shown in the drawing, insulating layers are formed at both sides in the track width direction (in the direction of the X-axis in the drawing) of the lower core layer 2.

As shown in FIG. 1, a plating underlayer 3, a lower pole layer 5, a gap layer 6, and an upper pole layer 7 are deposited on the lower core layer 2, and the lower pole layer 5, the gap layer 6, and the upper pole layer 7 constitute a pole section 13. The plating underlayer 3 acts as a foundation for plating growth when the pole section 13 is formed by plating. Additionally, the plating underlayer 3 may be omitted. The pole section 13 writes information into a medium by a leakage magnetic field from a magnetic gap G with a track width Tw. As shown in FIG. 2, the pole section 13 extends from a surface 14 facing a medium in the height direction (in the Y direction in the drawing), which may be also referred to as the depth direction of the thin-film magnetic head, to a gap depth (Gd) defining layer 4.

As shown in FIG. 1, an upper surface 40a of the lower core layer 2 may extend from the base of the pole section 13 parallel to the track width direction (the direction of the X-axis in the drawing), or inclined planes 40b which incline toward a direction opposite to an upper core layer 12 may be formed in the lower core layer 2. By forming the inclined planes 40b in the upper surface of the lower core layer 2, write fringing (side fringing) can be suppressed more appropriately. The angle θ1 is an angle between a line parallel to the track width direction, e.g., the upper surface 40a, and the inclined plane 40b. If the angle θ1 is smaller than 2°, the distance between the lower core layer 2 and the upper pole layer 7 is small and the effect of suppressing write fringing is not greatly expected. If the angle θ1 is larger than 10°, although the effect of suppressing write fringing is superior, since the volume of the lower core layer 2 is reduced, noise may occur to the magnetoresistive element formed beneath the lower core layer 2. Therefore, the angle θ1 is preferably in the range of to 2° to 10°.

The gap depth (Gd) defining layer (hereinafter referred to as the Gd-defining layer) 4 is composed of a nonmagnetic material, such as a resist. Since the pole section 13 extends from the surface 14 facing the medium to the GD-defining layer 4 in the height direction toward the back, a distance from the surface 14 to the point at which the joint surface between the upper pole layer 7 and the gap layer 6 is in contact with the Gd-defining layer 4 is defined as the gap depth Gd. As shown in FIG. 1, the Gd-defining layer 4 extends from both sides of the pole section 13 in the track width direction, and the broken line indicates the shape of the extending sections 4a and 4b.

As shown in FIG. 2, a connecting point lifting layer 9 composed of a soft magnetic alloy, such as an Fe—Ni alloy (Permalloy), is formed on the lower core layer 2 toward the back from the Gd-defining layer 4. As shown in FIGS. 1 and 2, an insulating layer 8 composed of alumina or the like is formed at both sides in the track width direction of the pole section 13, at both sides and at the back in the height direction of the Gd-defining layer 4, and around the connecting point lifting layer 9. A coil layer 10 is spirally formed on the insulating layer 8 and an insulating layer 11 composed of an organic insulating material or the like is formed so as to cover the coil layer 10.

The upper core layer 12 which is composed of a soft magnetic alloy, such as an Fe—Ni alloy (Permalloy) is, for example, formed by frame plating. A front end 12a of the upper core layer 12 is magnetically coupled to the upper pole layer 7. A base 12b of the upper core layer 12 is magnetically coupled to the lower core layer 2 through the connecting point lifting layer 9 and the plating underlayer 3. The upper core layer 12 is covered by an insulating layer (not shown in the drawing).

The individual layers in the thin-film magnetic head 1 will be described in detail below.

The lower core layer 2 is composed of a soft magnetic material, such as an Fe—Ni alloy (Permalloy) and is formed by frame plating or the like.

The plating underlayer 3 is formed by sputtering or the like, and may be composed of the same material as or a different material from the lower core layer 2. The plating underlayer 3 may be a single-layered film or a multi-layered film.

The lower pole layer 5 is magnetically coupled to the lower core layer 2, and may be composed of the same material as or a different material from the lower core layer 2. The lower pole layer 5 may be a single-layered film or a multi-layered film. The thickness of the lower pole layer 5 is, for example, set at approximately 0.25 to 0.5 μm. If the lower pole layer 5 itself has a large volume, magnetic saturation at high recording densities can be avoided, and also write fringing due to a leakage magnetic field from the upper pole layer 7 to the lower core layer 2 can be prevented. Preferably, the lower pole layer 5 has a higher saturation magnetic flux density than that of the lower core layer 2, and thereby the recording magnetic field is concentrated in the vicinity of the magnetic gap G, resulting in an improvement in the recording density.

The gap layer 6 is composed of an insulating material, such as alumina, or a nonmagnetic material composed of a nonmagnetic metallic material, such as NiP. In the present invention, as shown in FIG. 1, the gap layer 6 is placed so as to include a portion in which the width in the track width direction (in the direction of the X-axis in the drawing) is the smallest in the pole section 13. The gap layer 6 extends from the surface 14 facing the medium to the Gd-defining layer 4 in the height direction, and the gap depth (Gd) is defined as the distance from the surface 14 to the point at which the joint surface between the upper pole layer 7 and the gap layer 6 is in contact with the GD-defining layer 4. Since the gap depth (Gd) greatly affects the electrical characteristics of the thin-film magnetic head, it has a predetermined length. The gap layer 6 is preferably composed of a nonmagnetic metallic material. If the gap layer 6 is composed of the nonmagnetic metallic material, the lower pole layer 5, the gap layer 6, and the upper pole layer 7 can be continuously formed by plating, thus facilitating the formation of the pole section 13. In the present invention, preferably, the gap layer 6 is composed of at least one nonmagnetic metallic material selected from the group consisting of NiP, NiPd, NiW, NiMo, NiRh, Au, Pt, Rh, Pd, Ru, and Cr. The gap layer 6 may be a single-layered film or a multi-layered film. In the thin-film magnetic head 1 in this embodiment, it is possible to set the maximum width in the track width direction of the gap layer 6 at 0.4 μm or less, for example, approximately 0.1 to 0.4 μm. The thickness of the gap layer 6 is, for example, approximately 0.2 μm.

The upper pole layer 7 which is magnetically coupled to the upper core layer 12 is formed by plating on the gap layer 6. The upper pole layer 7 may be composed of the same material as or a different material from the upper core layer 12. The upper pole layer 7 may be a single-layered film or a multi-layered film. The thickness of the upper pole layer 7 is, for example, approximately 2.4 to 2.7 μm.

In this embodiment, as shown in FIGS. 1 and 2, the upper pole layer 7 has a two-layered structure including an upper layer 7a and a lower layer 7b composed of soft magnetic materials, such as Fe—Ni alloys. The back end of the lower layer 7b is brought into contact with the GD-defining layer 4, and the back end of the upper layer 7a extends over the Gd-defining layer 4. The saturation magnetic flux density of the lower layer 7b is higher than that of the upper layer 7a. If the upper pole layer 7 is a multi-layered film in which the saturation magnetic flux density increases as the distance from the gap layer 6 decreases, the magnetic flux flowing from the upper core layer 12 can be easily concentrated in the vicinity of the magnetic gap G, and thus the recording density can be improved. Additionally, the thickness of the lower layer 7b may be increased so that the back end of the lower layer 7b extends over the Gd-defining layer 4 and the upper layer 7a and the upper core layer 12 are deposited on the lower layer 7b in that order. In such a case, since the volume of the lower layer 7b having a large saturation magnetic flux density is increased, the overwrite characteristic can be further improved.

In the present invention, the structure of the pole section 13 is not limited to the laminate including the lower pole layer 5, the gap layer 6, and the upper pole layer 7. That is, the pole section 13 may be a two-layered film including the gap layer 6 and the upper pole layer 7. Preferably, the width in the track width direction of the pole section 13 is smaller than the width in the track width direction of the lower core layer 2 when viewed from the surface 14 facing the medium. Consequently, the magnetic flux is concentrated in the pole section 13. Preferably, the width in the track width direction of the pole section 13 is smaller than the width in the track width direction of the upper core layer 12 when viewed from the surface 14 facing the medium.

In the pole section 13 having the structure described above, as shown in FIG. 1, the width in the track width direction of the lower pole layer 5 is set so as to gradually increase with distance from the gap layer 6. The width in the track width direction of the upper pole layer 7 is set so as to gradually increase with distance from the gap layer 6. The gap layer 6 is formed so as to include a portion with the smallest width in the track width direction of the pole section 13.

When the gap layer 6 of the pole section 13 has a trapezoidal cross section viewed from the surface 14 facing the medium, preferably, a difference between the width in the track width direction of the upper surface of the gap layer 6 and the width in the track width direction of the lower surface of the gap layer 6 is 0.1 μm or less. If the difference is set in this range, write fringing can be suppressed and the overwrite characteristic is ensured.

As described above, although the lower pole layer 5 and the upper pole layer 7 constituting the pole section 13 may be composed of the same materials as or different materials from those of the core layers to which the individual pole layers are magnetically coupled, in order to improve the recording density, preferably, the lower pole layer 5 and the upper pole layer 7 have higher saturation magnetic flux densities than those of the core layers to which the individual pole layers are magnetically coupled. If the lower pole layer 5 and the upper pole layer 7 have higher saturation magnetic flux densities as described above, the recording magnetic field can be concentrated in the vicinity of the gap and the recording density can be improved.

Figure 3:
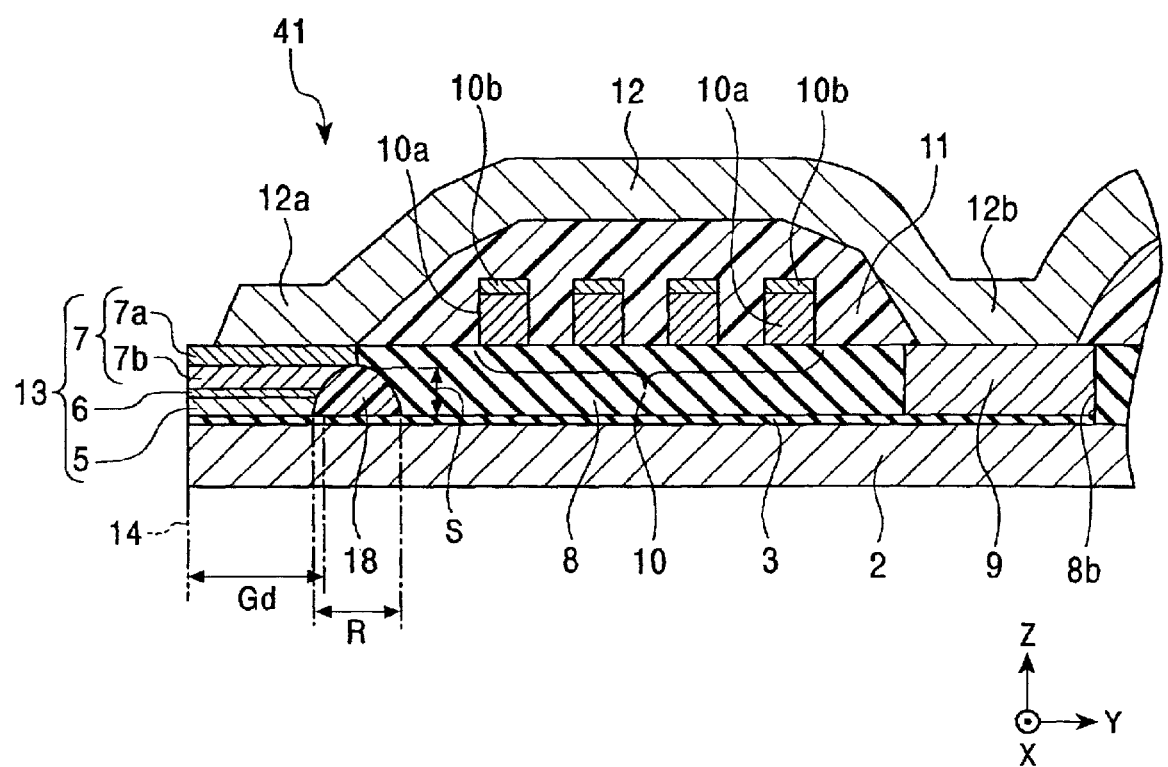
FIG. 3 is a partial sectional view which illustrates another Gd-defining layer in a thin-film magnetic head of the present invention.

The Gd-defining layer 4 composed of a resist or the like is formed on the lower core layer 2 (optionally with the plating underlayer 3 therebetween), and has inclined planes at the surface 14 side and at the connecting point lifting layer 9 side. Instead of an organic insulating material, such as the resist, nonmagnetic materials, for example, an inorganic insulating material, such as alumina ($Al_2O_3$) or $SiO_2$, or a nonmagnetic metallic material, such as Cu, may be used. Although the Gd-defining layer 4 has a trapezoidal cross section as shown in FIG. 2 in this embodiment, the Gd-defining layer 4 may have a curved surface as shown in FIG. 3. The shape of the Gd-defining layer 4 is not limited to the shapes shown in the drawings. The joint surface between the upper pole layer 7 and the gap layer 6 is brought into contact with the inclined plane at the surface 14 side of the Gd-defining layer 4. Consequently, it is possible to define the distance from the surface 14 facing the medium to the point at which the joint surface between the upper pole layer 7 and the gap layer 6 is in contact with the Gd-defining layer 4 as the gap depth Gd. Additionally, in the thin-film magnetic head of the present invention, in order to determine the gap depth Gd accurately, preferably, the joint surface between the upper pole layer 7 and the gap layer 6 is placed lower than the height S in the thickness direction of the Gd-defining layer 4.

In the thin-film magnetic head in this embodiment, the width W of each of the extending sections 4a and 4b, which is etched by ion milling or the like as described below, is set in the range of 2 to 4 $\mu$m. The maximum length R in the height direction (in the Y direction) of the Gd-defining layer 4 is preferably approximately 3 to 8 $\mu$m. The height S in the thickness direction (in the Z direction) of the GD-defining layer 4 is preferably approximately 0.7 to 3 $\mu$m.

Figure 24:
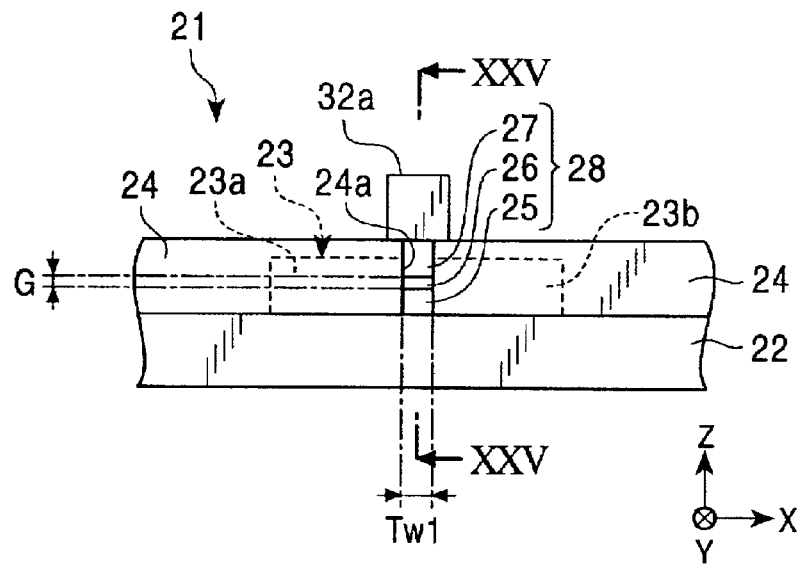
FIG. 24 is a partial front view of a conventional thin-film magnetic head.
Figure 25:
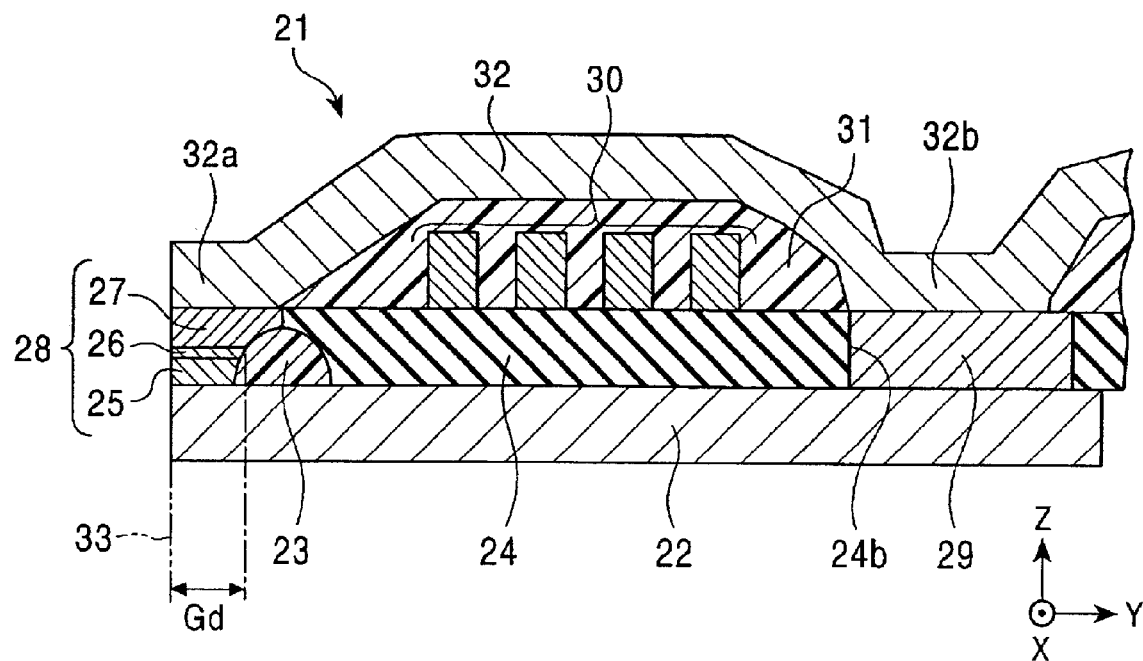
FIG. 25 is a sectional view taken along the line XXV—XXV of FIG. 24.
Figure 26:
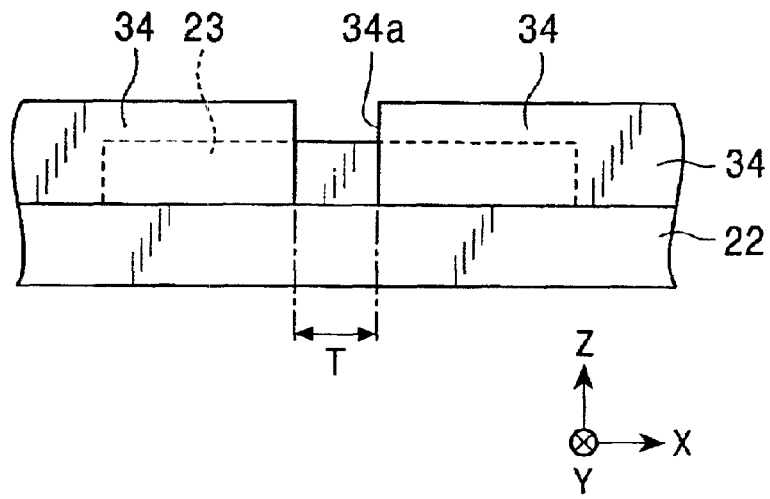
FIG. 26 is a partial front view showing a state in which a recess is made in a resist layer formed on a lower core layer in a method for fabricating a conventional thin-film magnetic head.
Figure 27:
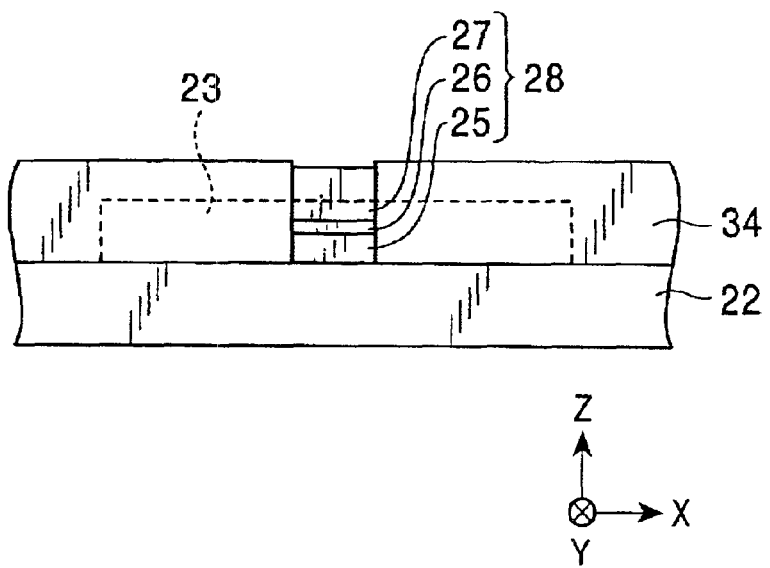
FIG. 27 is a partial front view showing a state in which a pole section is formed in the recess provided on the resist layer in the method for fabricating the conventional thin-film magnetic head.
Figure 28:
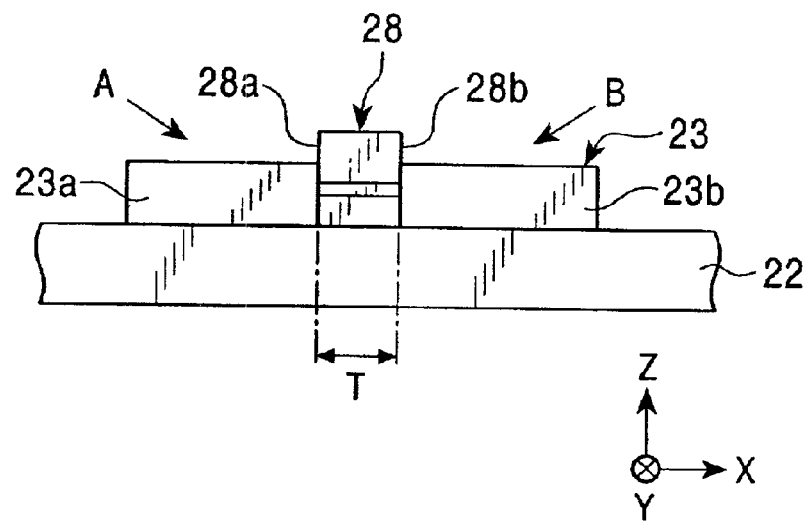
FIG. 28 is a partial front view showing a state in which the resist layer on the lower core layer is removed in the method for fabricating the conventional thin-film magnetic head.
Figure 29:
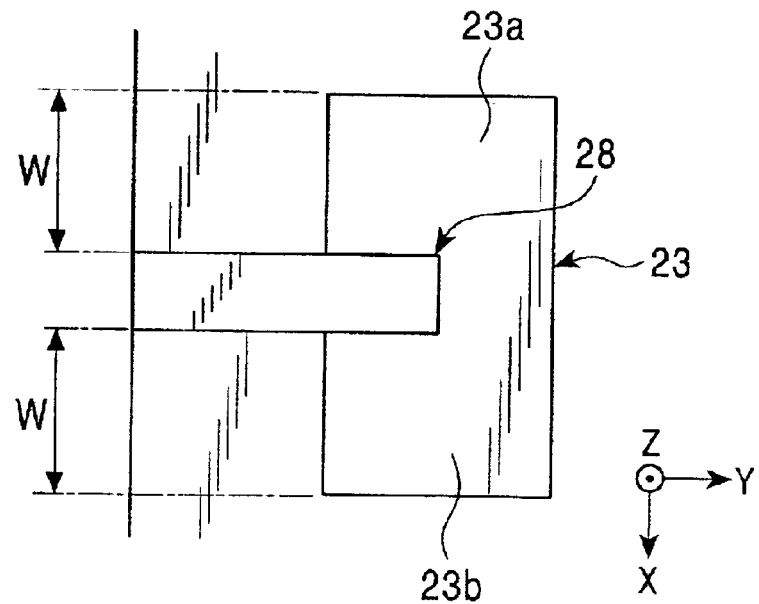
FIG. 29 is a plan view of the state shown in FIG. 28.
Figure 30:
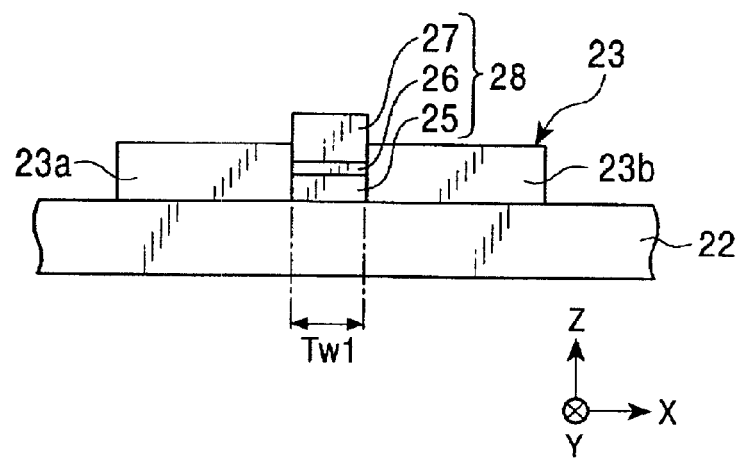
FIG. 30 is a partial front view showing a state in which both sides of the pole section has been etched in the method for fabricating the conventional thin-film magnetic head.
Figure 31:
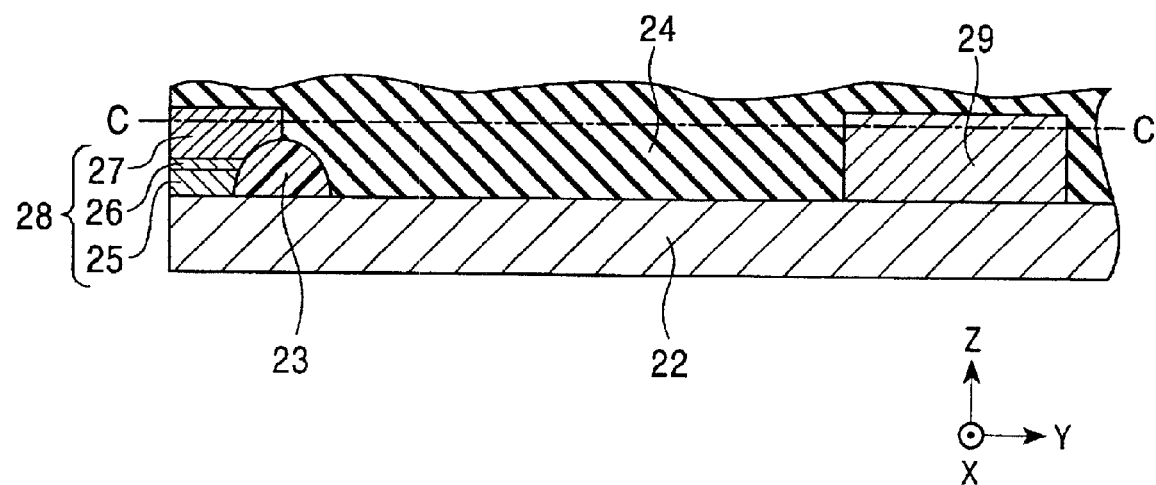
FIG. 31 is a sectional view showing a state in which an insulating layer is formed on the lower core layer in the method for fabricating the conventional thin-film magnetic head.
Figure 32:
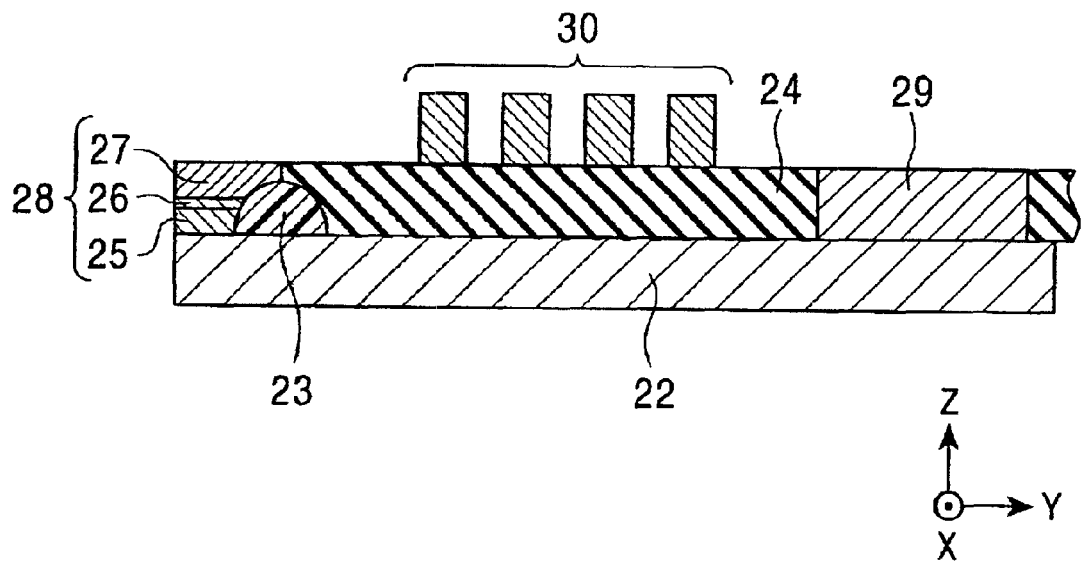
FIG. 32 is a sectional view showing a state in which the insulating layer is polished and planarized in the method for fabricating the conventional thin-film magnetic head.
Figure 33:
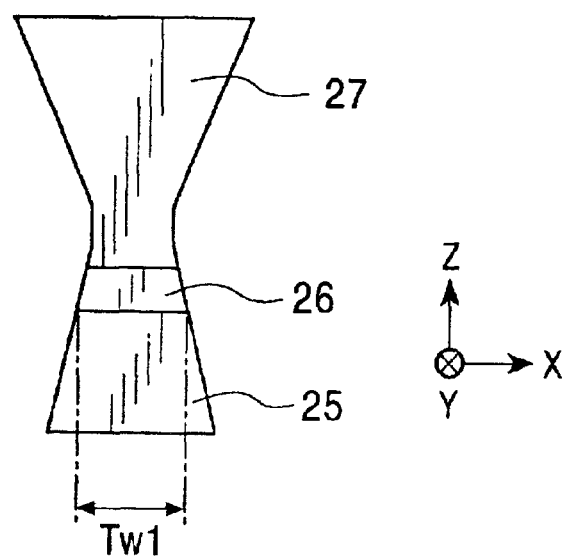
FIG. 33 is a partial front view which illustrates a problem associated with the conventional thin-film magnetic head.

Next, the Gd-defining layer 4 of the thin-film magnetic head 1 in this embodiment will be compared with the GD-defining layer 23 of the conventional thin-film magnetic head 21. As shown in FIG. 24, the width of each of the extending sections 23a and 23b of the Gd-defining layer 23 of the conventional thin-film magnetic head 21 exceeds 4 $\mu$m, and for example, is approximately 9 $\mu$m. That is, the GD-defining layer 23 has a curved surface. The reason for this is that by gaining the volume between the surface of the GD-defining layer 23 and the upper surface of the upper pole layer 27, magnetic saturation is relaxed and thus the so-called nonlinear transition shift (NLTS) performance or PW50 performance is improved.

However, in the conventional thin-film magnetic head 21, since the Gd-defining layer 23 has a curved surface, the width of each of the extending sections 23a and 23b must be sufficiently larger than the width of a portion of the GD-defining layer 23 on which the pole section 28 is disposed as described below.

In the thin-film magnetic head of the present invention, as will be described in detail with respect to the fabrication method, the width of each of the extending sections 4a and 4b can be set to be a predetermined width W without regard to the shape of the cross section of the GD-defining layer 4. That is, in the thin-film magnetic head of the present invention, even if the track width Tw is made narrower than the lower limit of resolution by photolithography, i.e., the resolution of the resist for exposure and development, it is possible to form a structure in which the gap layer has a width in the track width direction that is smaller than the width in the track width direction of the upper pole layer, i.e., it is possible to narrow the track width Tw.

Herein, the NLTS refers to a phase lead in which nonlinear distortion is caused because a leakage magnetic field occurring at the magnetic gap is influenced by a leakage magnetic field applied to the head from a magnetically recorded signal adjacently recorded in a magnetic disk which is a recording medium. The PW50 is a pulse width at the 50% peak amplitude level in a regenerated waveform, and as the half width is decreased, the recording resolution is improved.

As described above, in the thin-film magnetic head of the present invention, the Gd-defining layer 4 shown in FIG. 2 may have a curved surface. That is, as shown in FIG. 3, in a thin-film magnetic head 41 which has the same structure as the thin-film magnetic head 1 except for a Gd-defining layer 18, since the surface of the Gd-defining layer 18 is curved, the volume of the upper pole layer can be gained while the track width is narrowed, and thus superior NLTS performance and PW50 performance can be achieved.

The insulating layer 8 is preferably composed of at least one insulating material selected from AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON. The upper surface of the insulating layer 8 is flush with the joint surface between the upper pole layer 7 and the upper core layer 12.

The connecting point lifting layer 9 is composed of a soft magnetic material, such as an Fe—Ni alloy, and the upper surface thereof is flush with the joint surface between the upper layer 7a of the upper pole layer 7 and the upper core layer 12. The connecting point lifting layer 9 may be a multi-layered film, or may be composed of a highly conductive material, such as Cu.

The coil layer 10 is a two-layered film including a conductive material sublayer 10a composed of a conductive material with a low electrical resistance, such as Cu, and a conductive protective sublayer 10b composed of Ni or the like for protecting the conductive material layer 10a from oxidation. The coil layer 10 is spirally formed over the upper surface of the insulating layer 8. The coil layer 10 is placed between the lower core layer 2 and the upper core layer 12 with insulating layers therebetween, and when a recording current is applied to the coil layer 10, a recording magnetic field is induced in the upper core layer 12 and the lower core layer 2 and also in the upper pole layer 7 and the lower pole layer 5 which are magnetically coupled thereto, and a leakage magnetic field is produced from the magnetic gap G at the surface 14 facing the medium.

The insulating layer 11 is composed of an organic insulating material, such as a novolak resin, and insulates the coil layer 10 from the upper core layer 12.

The upper core layer 12 is composed of a soft magnetic material, such as an Fe—Ni alloy (Permalloy). The front end 12a of the upper core layer 12 recedes from the surface 14 facing the medium toward the back (in the Y direction), and the upper core layer 12, the lower core layer 2, the plating underlayer 3, the connecting point lifting layer 9, and the pole section 13 constitute a magnetic circuit having the magnetic gap G.

Although one coil layer is formed in the thin-film magnetic head shown in FIG. 2, two or more coil layers may be formed. In such a case, for example, another coil layer is embedded in the insulating layer 8 at the back of pole section 13, and the coil layer 10 is formed on the insulating layer 8. By forming a multiple coil layers, a magnetic field produced from the coil layers can be increased, and thus higher recording densities are enabled. Additionally, since the distance from the surface 14 facing the medium to the connecting point lifting layer 9 can be decreased, a shorter magnetic circuit is formed, which is more advantageous to recording at high frequencies.

In the first embodiment of the present invention, as shown in FIGS. 1 and 2, the front end 12a of the upper core layer 12 recedes from the surface 14 facing the medium in the height direction (in the Y direction in the drawing). Consequently, side fringing can be more effectively suppressed.

As described above, in the thin-film magnetic head 1 in the first embodiment of the present invention, since the upper pole layer 7 and the upper core layer 12 are separately formed, a narrow track width is achieved. Furthermore, since the gap layer 6 is formed so as to include a portion with the smallest width in the track width direction of the pole section 13, it is possible to achieve a track width Tw of 0.4 μm or less, for example, approximately 0.1 to 0.4 μm, which is below the lower limit of the resolution by photolithography, i.e., the resolution of the resist for exposure and development, and thereby high density magnetic recording can be performed. If the width in the track width direction of the gap layer 6 is smaller than the width in the track width direction of the upper pole layer 7, it is possible to concentrate the recording magnetic field guided from the upper core layer 12 to the upper pole layer 7 in the magnetic gap G.

Figure 4:
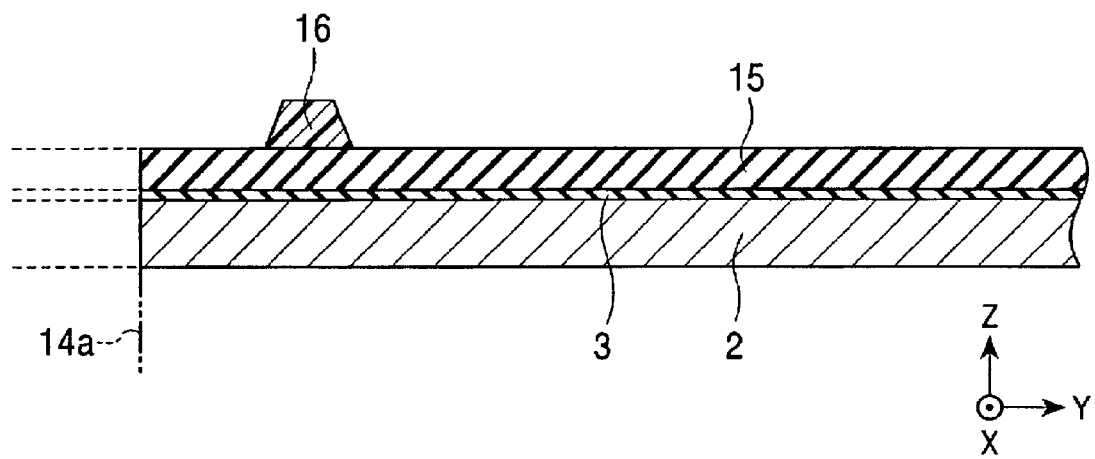
FIG. 4 is a sectional view showing a step of forming an inorganic insulating layer on a lower core layer in a method for fabricating a thin-film magnetic head of the present invention.

A method for fabricating the thin-film magnetic head 1 will now be described. As shown in FIG. 4, with respect to the thin-film magnetic head of the present invention, many thin-film magnetic heads are usually formed on a wafer, and the wafer is diced to produce the individual thin-film magnetic heads. For example, first, a certain surface of a wafer is set as a surface (temporary surface) 14a for forming a surface facing a medium, and fabrication is performed. When the individual thin-film magnetic heads are completed, dicing and polishing are performed to remove the surface 14a and the surface 14 facing the medium is formed. Hereinafter, description of the surface 14a and its removal process will be omitted.

First, as shown in FIG. 4, a plating underlayer 3 is formed on a lower core layer 2. The plating underlayer 3 may be omitted. An inorganic insulating layer 15 for forming a Gd-defining layer 4 is formed on the plating underlayer 3 by a film deposition process, and then a resist layer 16 is formed on the inorganic insulating layer 15 at a position receding from the surface 14a in the height direction, the distance from the surface 14a to the resist layer 16 being substantially equal to the gap depth.

Figure 5:
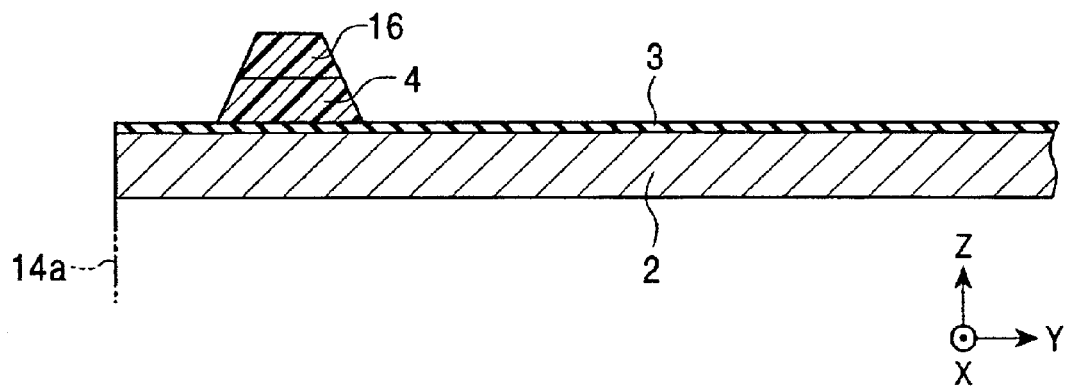
FIG. 5 is a sectional view showing a step of forming a Gd-defining layer from the inorganic insulating layer in the method for fabricating the thin-film magnetic head of the present invention.

Next, as shown in FIG. 5, the inorganic insulating layer 15 is etched by dry etching, such as ion milling or reactive ion etching (RIE), using the resist layer 16 as a mask, to produce a Gd-defining layer 4, and the resist layer 16 on the Gd-defining layer 4 is removed.

Figure 6:
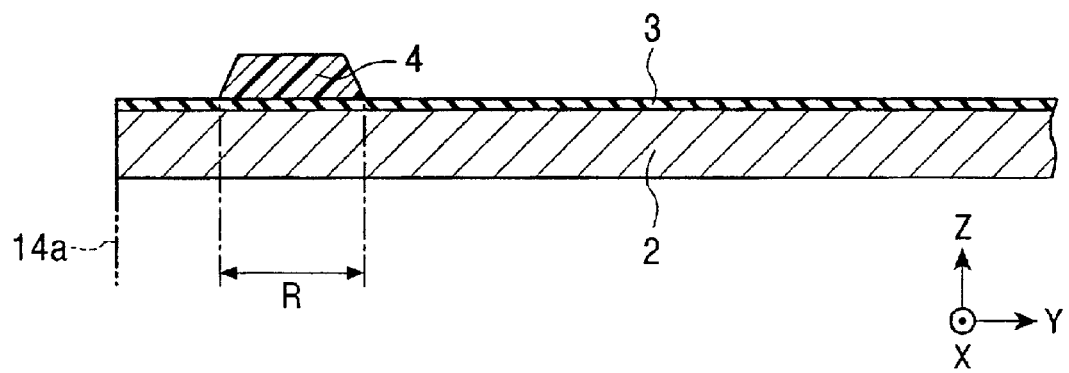
FIG. 6 is a sectional view showing a step of forming a Gd-defining layer made of an organic insulating material in the method for fabricating the thin-film magnetic head of the present invention.

Alternatively, as shown in FIG. 6, a Gd-defining layer 4 may be formed directly so as to have a rectangular cross section using an organic insulating layer composed of a UV curable resin or the like, for example, a resist, at a position receding from the surface 14a in the height direction, the distance from the surface 14a to the resist layer 16 being substantially equal to the gap depth.

After the Gd-defining layer 4 is formed in the rectangular shape, post-baking (heat treatment) may be performed so that sagging of the resist occurs to form a curved surface in which the depth in the height direction gradually increases in the Z direction. After the shape of the resist is determined, the Gd-defining layer 4 is cured by ultraviolet-light irradiation. In order to cause the sagging of the resist to form the curved surface in which the depth in the height direction gradually increases in the Z direction, the maximum length R in the height direction (in the Y direction) of the Gd-defining layer 4 must have a certain length. Therefore, the width W of each of the extending sections 4a and 4b must be approximately 12 to 21 times the width in the track width direction of the pole section 13.

Figure 7:
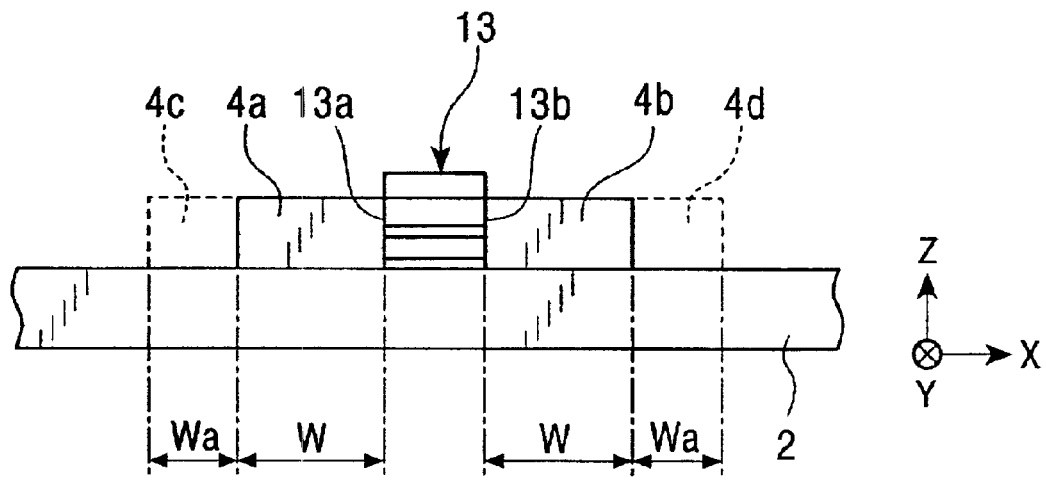
FIG. 7 is a partial front view showing a step of adjusting each extending section of a Gd defining section so as to have a predetermined width in the method for fabricating the thin-film magnetic head of the present invention.
Figure 8:
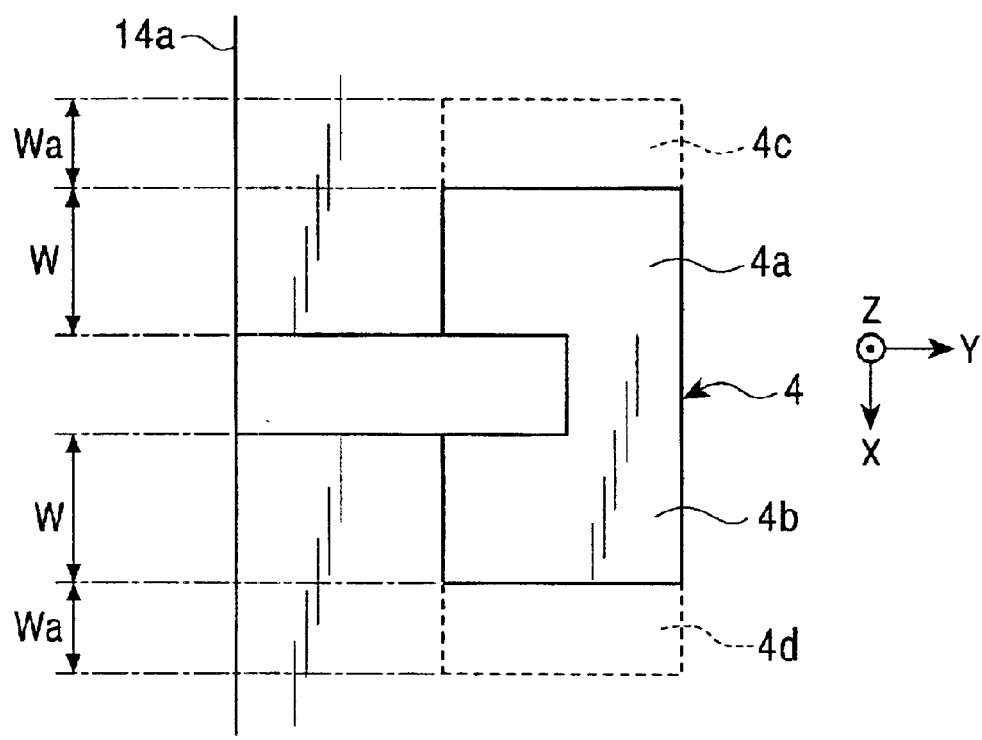
FIG. 8 is a partial plan view showing the step of adjusting each extending section of the Gd defining section so as to have the predetermined width in the method for fabricating the thin-film magnetic head of the present invention.

In the method for fabricating the thin-film magnetic head of the present invention, as shown in FIGS. 7 and 8, preferably, the width W of each of the extending sections 4a and 4b of the Gd-defining layer 4 extending in the side regions has a predetermined length. In the first embodiment of the present invention, the width W of each of the extending sections 4a and 4b is set at 4 μm. For example, by directly forming the Gd-defining layer 4 in the rectangular shape as shown in FIG. 6, the width W of each the extending sections 4a and 4b of the Gd-defining layer 4 can be set to be a predetermined length.

If the width of each of the extending sections of the Gd-defining layer 4 is longer than the predetermined width, as shown in FIGS. 7 and 8, the width Wa of each of the extra extending sections 4c and 4d extending in the side regions may be etched by ion milling or the like using the pole section 13, which is formed by a process described below, as a mask (or by covering the predetermined length by a new mask), in order to adjust the width W of each of the extending sections 4a and 4b. Alternatively, the extra extending sections 4c and 4d may be removed by $O_2$ ashing, reactive ion etching (RIE), or the like using the pole section 13 as a mask (or by covering the predetermined length by a new mask), to achieve the predetermined length. More preferably, ion coupling plasma-reactive ion etching is used because etching can be performed with strong anisotropy. The entire width W of each of the extending sections 4a and 4b may be etched by the process described above.

Consequently, by forming both extending sections of the Gd-defining layer so as to have a longer width than the predetermined width, and by removing the unnecessary extending sections later, it is possible to achieve the desired width of each of the extending sections even if the Gd-defining layer has any surface configuration. For example, in the thin-film magnetic head shown in FIG. 3, the width of each of the extending sections of the Gd-defining layer can be set at 4 μm or less.

In this embodiment, an example in which the Gd-defining layer 4 is formed using an organic insulating layer, such as a resist, will be described. The Gd-defining layer 4 may be formed using a nonmagnetic metallic layer, such as Cu.

Figure 9:
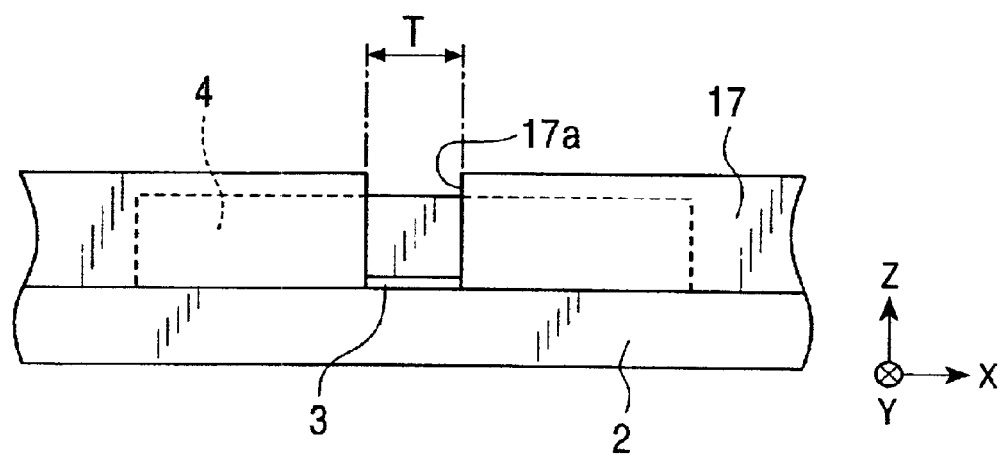
FIG. 9 is a partial front view showing a step of forming a recess for forming a pole section in the method for fabricating the thin-film magnetic head of the present invention.
Figure 10:
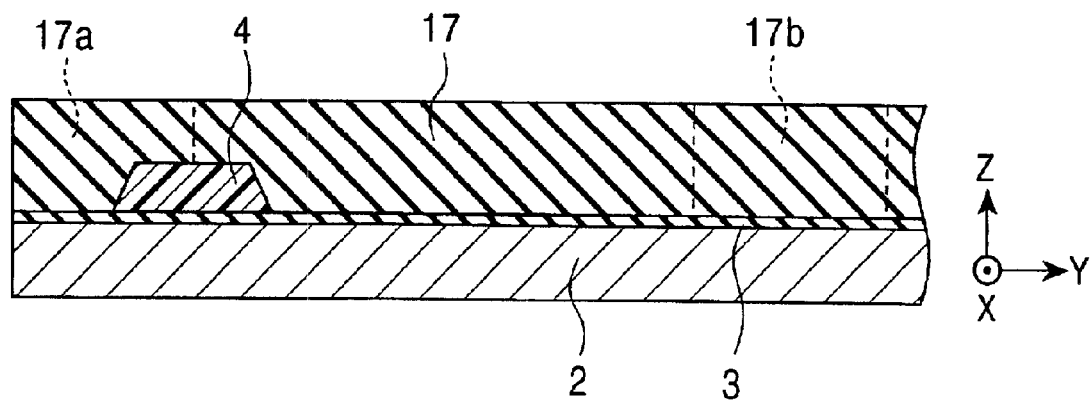
FIG. 10 is a partial sectional view showing the step of forming the recess for forming the pole section in the method for fabricating the thin-film magnetic head of the present invention.

Next, as shown in FIGS. 9 and 10, a resist layer 17 is formed by coating on the plating underlayer 3 so as to cover the Gd-defining layer 4, and a recess 17a extending to the Gd-defining layer 4 is made in the resist layer 17 by photolithography, and also a hole 17b corresponding to the connecting point lifting layer 9 is made in the resist layer 17 by photolithography. If the width T of the recess 17a is too small, the resolution by photolithography is excessively degraded, and the accurate formation is not allowed. For example, when the i-line (wavelength 365 nm) is used as a light source for exposure, the threshold value for accurate formation is approximately 0.5 μm, and it is difficult to set the width T, for example, at 0.4 μm or less in view of accuracy. Even though the light source for exposure is changed, the threshold value for accurate formation of the recess 17a is at some point. Therefore, the width T of the recess 17a corresponds to the width-defining section which substantially defines the predetermined track width of the pole section 13.

Figure 11:
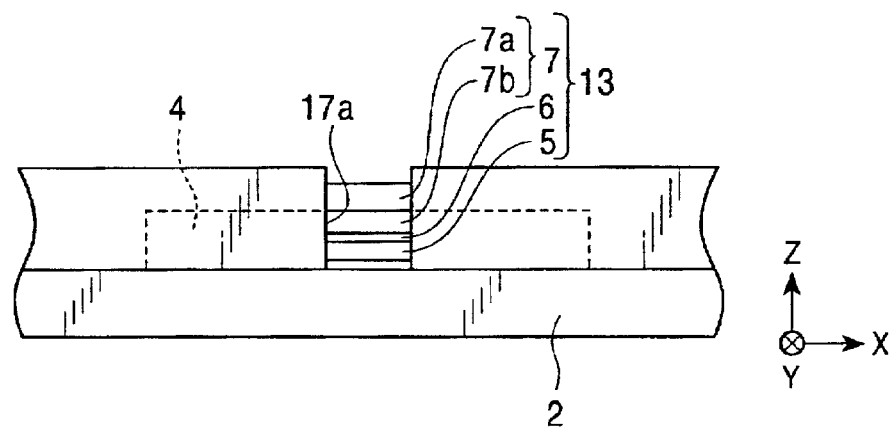
FIG. 11 is a partial front view showing a step of forming a pole section in the method for fabricating the thin-film magnetic head of the present invention.
Figure 12:
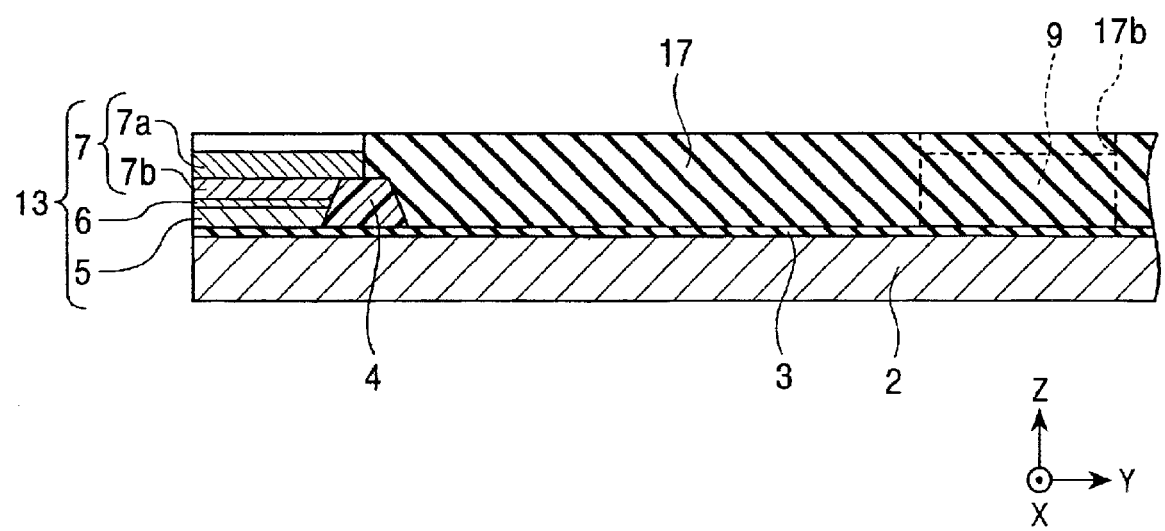
FIG. 12 is a partial sectional view showing the step of forming the pole section in the method for fabricating the thin-film magnetic head of the present invention.

Next, as shown in FIGS. 11 and 12, the lower pole layer 5, the gap layer 6, and the upper pole layer 7 are formed in the recess 17a using electrolytic plating, and the pole section 13 is thereby formed.

Additionally, the lower pole layer 5 may be omitted and a pole section may be formed by depositing a plating underlayer (optional), a gap layer, and an upper pole layer on the lower core layer 2. When the lower pole layer 5 is not provided, preferably, the lower core layer 2 in the region other than the region opposed to the upper pole layer 7 with the gap layer 6 therebetween is etched by ion milling or the like so that a convex section of the lower core layer is formed under the gap layer 6.

Figure 13:
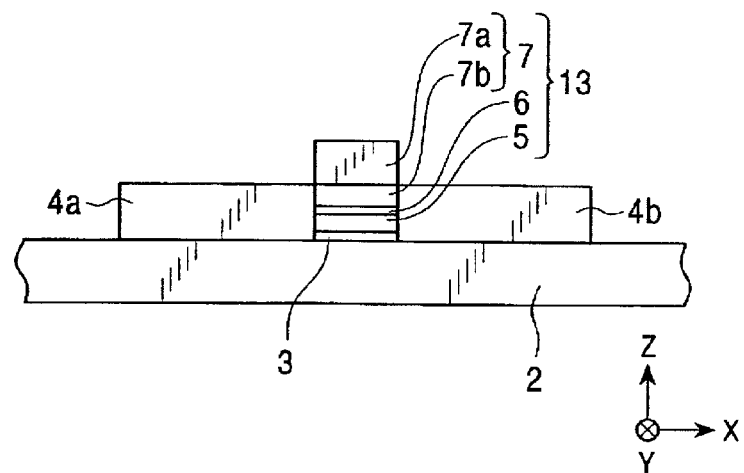
FIG. 13 is a partial front view showing a state in which the recess has been removed in the method for fabricating the thin-film magnetic head of the present invention.
Figure 14:
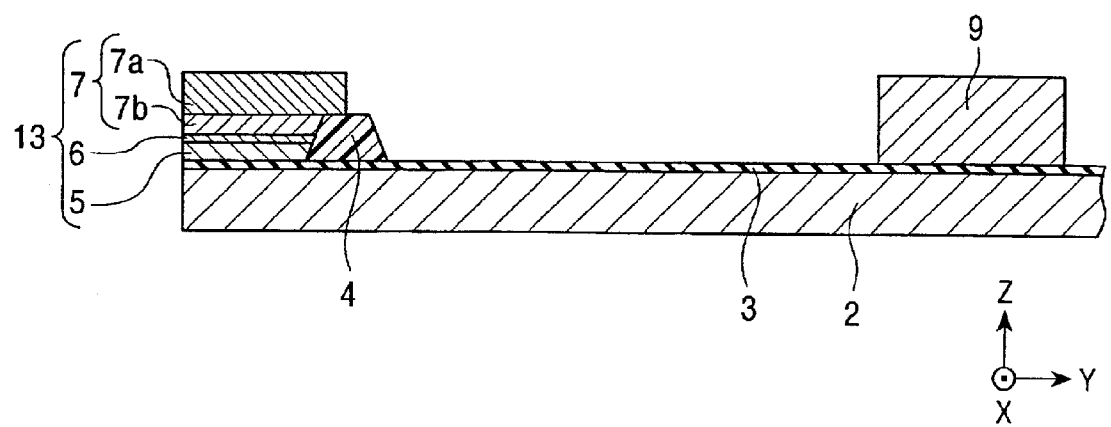
FIG. 14 is a partial sectional view showing the state in which the recess has been removed in the method for fabricating the thin-film magnetic head of the present invention.

Simultaneously with or separately from the formation of the pole section 13, the connecting point lifting layer 9 shown in FIG. 2 is formed in the hole 17b by electrolytic plating, and as shown in FIGS. 13 and 14, the resist layer 17 on the plating underlayer 3 is removed.

Figure 15:
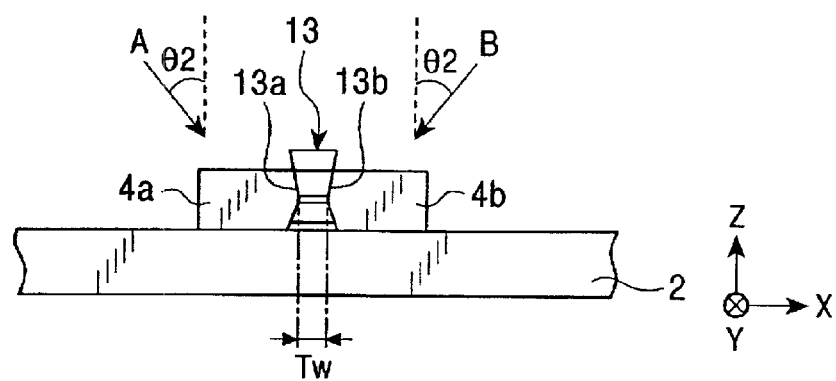
FIG. 15 is a partial front view showing a step of etching the sides of the pole section in the method for fabricating the thin-film magnetic head of the present invention.

Next, the etching step for achieving a track width Tw which is below the lower limit of the resolution by photolithography, i.e., the resolution of the resist for exposure and development will be described. As shown in FIG. 15, the sides 13a and 13b of the pole section 13 are etched by ion milling or the like in which ion irradiation is performed in slanting directions (the A direction and the B direction) at an ion irradiation angle θ2 so that the pole section 13 has the predetermined track width Tw. The ion irradiation angle θ2 is an angle with respect to the direction perpendicular to the lower core layer 2 (or the wafer reference plane). The upper surface of the lower core layer 2 may be also etched so as to form the inclined planes 40b simultaneously with or separately from the etching of the sides 13a and 13b of the pole section 13 by iron irradiation. In order to prevent the redeposition of magnetic dust produced by the etching of the lower core layer 2, and also in order to set the angle θ1 of the inclined planes 40b in a predetermined range, the ion irradiation angle θ2 must be appropriately set during the ion irradiation.

In the present invention, preferably, the ion irradiation angle θ2 is set at 45° to 75°. As is confirmed by the finding in an example described below, if the ion irradiation angle θ2 is set at 45° to 75°, the etching rate for the sides 13a and 13b of the pole section 13 is positive, and thus appropriate etching is enabled. On the other hand, the upper surface of the upper pole layer 7 is also etched by ion irradiation, and the etching rate for the upper surface of the upper pole layer 7 is highest when the ion irradiation angle θ2 is in the range of approximately 40° to 45°, which is not desirable. Therefore, the angle θ2 is preferably 45° or more. Furthermore, if the ion irradiation angle θ2 is set at 45° to 75°, the etching rate for the upper surface of the lower core layer 2 at both sides in the track width direction of the pole section 13 is positive, and thus appropriate etching is performed and redeposition is unlikely to occur.

Furthermore, in the present invention, if the ion irradiation angle θ2 is set at 55° to 70°, as is confirmed by the finding in the example described below, the etching rate for the sides 13a and 13b of the pole section 13 and the etching rate for the upper surface of the lower core layer 2 at both sides of the pole section 13 are positive, and etching is particularly appropriately performed. Since the ion irradiation angle θ2 is 45° or more, the etching amount of the upper surface of the upper pole layer 7 is decreased and the volume of the upper pole layer 7 can be increased, and thus a structure in which saturation does not easily occur can be formed. Redeposition by ion milling or the like is also decreased.

As described above, in the etching step, etching of the sides 13a and 13b of the pole section 13 and etching of the upper surface of the lower core layer 2 at both sides of the pole section 13 may be performed simultaneously or separately. Since the inclined planes 40b are formed, the optimum range of the etching rate for the upper surface of the lower core layer 2 at both sides of the pole section 13 and the optimum range of the etching rate for the sides 13a and 13b of the pole section 13 are different.

For example, the sides 13a and 13b of the pole section 13 may be etched first by setting the ion irradiation angle θ2 in a range of 60° to 75° to decrease the width in the track width direction of the pole section 13, and then the upper surface of the lower core layer 2 may be etched by changing the ion irradiation angle θ2 in a range of 45° to 60° to form the inclined planes 40b with the appropriate angle θ1 of inclination. The above etching order may be reversed.

By performing the etching step described above, the track width Tw which is below the lower limit of the resolution by photolithography, i.e., the resolution of the resist for exposure and development is achieved. The etching step is not limited to a particular light source of the exposure apparatus because even the light source of the exposure apparatus is changed, there is a limit to the accurate formation of the recess.

In particular, in the present invention, the width W of each of the extending sections 4a and 4b of the Gd-defining layer 4 is narrower than the width of each of the extending sections 23a and 23b of the Gd-defining layer 23 of the conventional thin-film magnetic head 21. Consequently, during the ion irradiation, the shadowing effect of the extending sections 4a and 4b of the Gd-defining layer 4 is suppressed, and irradiated ions by ion milling or the like spread sufficiently to the gap layer 6 and the lower pole layer 5 of the pole section 13. For example, in this embodiment, the width W in the track width direction (in the direction of the X-axis) of each of the extending sections 4a and 4b of the Gd-defining layer 4 is approximately 4 µm, while, for the reason described above, the width W in the track width direction of each of the extending sections 23a and 23b of the Gd-defining layer 4 in the conventional thin-film magnetic head 21 is larger than 4 µm, for example, approximately 9 µm.

Consequently, as shown in FIG. 15, the width in the track width direction of the gap layer 6 is the smallest among the various widths in the track width direction of the magnetic pole section 13, and the track width Tw can be adjusted to a predetermined length of 0.4 µm or less, i.e., approximately 0.1 to 0.4 µm, which is smaller than the conventional track width.

Figure 16:
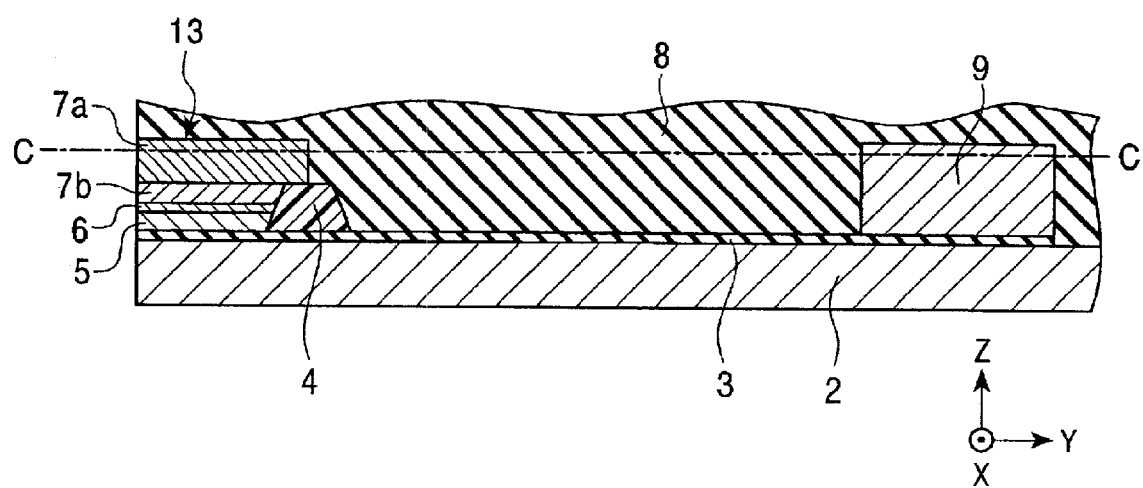
FIG. 16 is a partial sectional view showing a state before an insulating layer is polished in the method for fabricating the thin-film magnetic head of the present invention.
Figure 17:
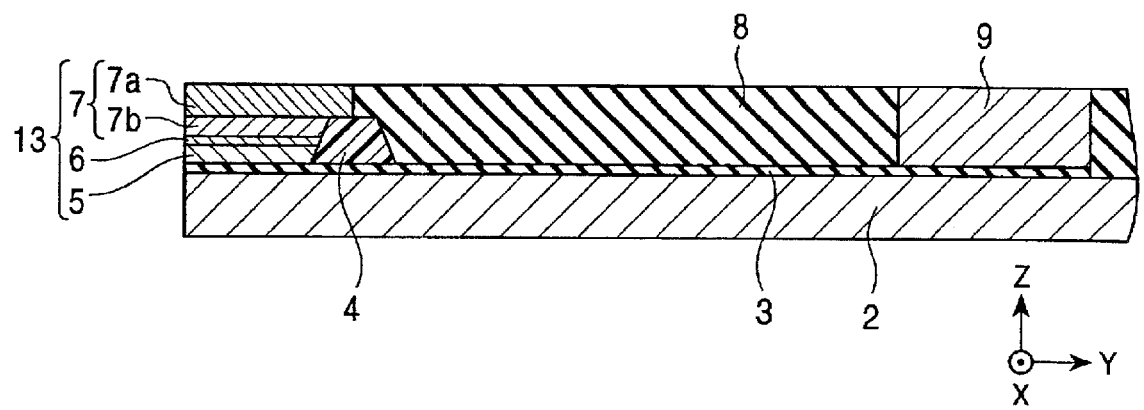
FIG. 17 is a partial sectional view showing a state in which the insulating layer is polished and planarized in the method for fabricating the thin-film magnetic head of the present invention.
Figure 18:
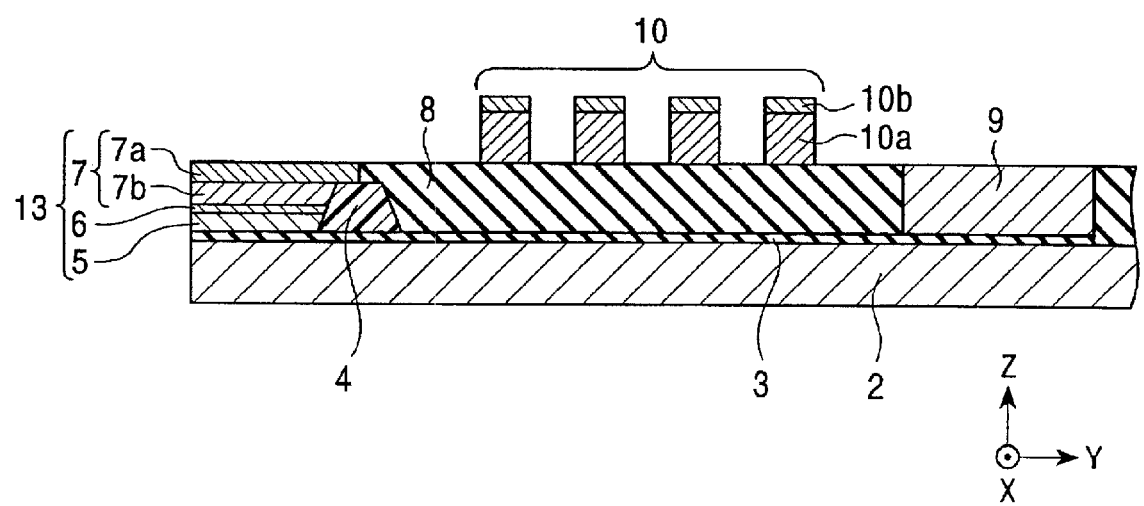
FIG. 18 is a partial sectional view showing a state in which a coil layer is formed on the insulating layer in the method for fabricating the thin-film magnetic head of the present invention.

Next, as shown in FIG. 16, the insulating layer 8 is formed on the lower core layer 2 so as to cover the pole section 13 and the connecting point lifting layer 9, and then the insulating layer 8 is polished and planarized to the line C—C by chemical mechanical polishing (CMP). The state shown in FIG. 17 is thereby formed. As shown in FIG. 18, the coil layer 10 is formed on the planarized insulating layer 8 by combining sputtering, electrolytic plating, and photolithography.

The insulating layer 11 is formed on the insulating layer 8 so as to cover the coil layer 10, and the upper core layer 12 is formed on the insulating layer 11 by patterning using a know process, such as frame plating. The fabrication of the major part of the thin-film magnetic head 1 shown in FIGS. 1 and 2 is thereby completed. Finally, leading of the coil layer 10 of the thin-film magnetic head 1 covered by an insulating layer (not shown in the drawing) and formation of external terminals are performed, and dicing and polishing of the individual magnetic heads are performed. The magnetic head is thereby obtained.

As described in the etching step, it is possible to etch the lower core layer at the ion irradiation angle θ2 by ion milling or the like. Therefore, when the plating underlayer 3 (optional), the gap layer 6, the upper pole layer 7 are formed on the lower core layer 2 without forming the lower pole layer 5, the lower core layer 2 may be etched in the region other than the region opposed to the upper pole layer 7 with the gap layer 6 therebetween to form a convex section, which is a protrusion of the lower core layer 7, under the gap layer 6. Alternatively, before etching the sides 13a and 13b of the pole section 13, the lower core layer 2 only may be intensively etched by performing ion irradiation substantially perpendicular to the lower core layer 2 (at an angle of 0° to 15°), and both sides of the pole section 13 may be etched at the angle θ2 of ion irradiation.

The thin-film magnetic head 1 in the first embodiment of the present invention may be used as a floating type magnetic head and when it is built in a magnetic disk unit and a recording current is applied to the coil layer 10 of the thin-film magnetic head 1, a recording magnetic field is induced in the upper core layer 12 and the lower core layer 2 and also in the upper pole layer 7 and the lower pole layer 5 magnetically coupled thereto. A leakage magnetic field from the magnetic gap G at the surface 14 facing the medium enables writing of information into a magnetic disk which is the magnetic recording medium rotating in the Z direction with a track width which is narrower than that in the conventional thin-film magnetic head.

Figure 19:
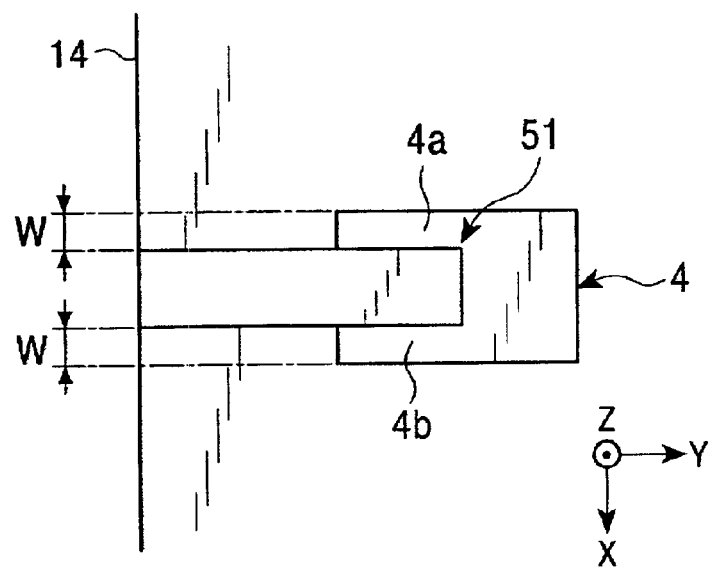
FIG. 19 is a partial plan view showing a pole section and both extending sections of a Gd-defining layer of a thin-film magnetic head in a second embodiment of the present invention.
Figure 20:
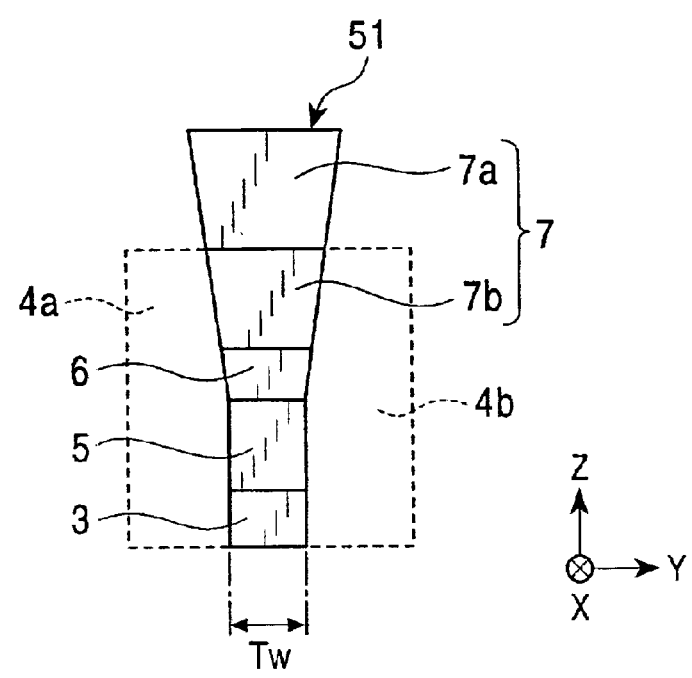
FIG. 20 is a partial front view showing the pole section of the thin-film magnetic head shown in FIG. 19.

A second embodiment of the present invention will be described with reference to FIGS. 19 and 20. FIG. 19 is a partial plan view showing a pole section and both extending sections of a Gd-defining layer of a thin-film magnetic head in the second embodiment of the present invention, and FIG. 20 is a partial front view of the pole section of the thin-film magnetic head in the second embodiment. The thin-film magnetic head in the second embodiment is the same as the thin-film magnetic head 1 in the first embodiment except for a pole section 51.

The pole section 51 of the thin-film magnetic head in the second embodiment includes a lower pole layer 5, a gap layer 6, and an upper pole layer 7 formed on a plating underlayer 3, the same as the thin-film magnetic head 1 in the first embodiment.

In the thin-film magnetic head in this embodiment, due to etching by ion milling or the like, the width W of each of extending sections 4a and 4b is 0.5 to 1 μm.

As shown in FIG. 20, when viewed from the surface 14 facing the medium, the width in the track width direction (in the direction of the X-axis in the drawing) of the lower pole layer 5 is substantially constant in the thickness direction of the lower pole layer 5 and is substantially the same as the width in the track width direction of the gap layer 6. The width in the track width direction of the upper pole layer 7 gradually increases with distance from the gap layer 6. The width in the track width direction of the gap layer 6 is placed at the portion with the smallest width in the pole section 51. In the thin-film magnetic head in this embodiment, the maximum width in the track width direction of the gap layer 6 can be set at 0.4 μm or less, for example, approximately 0.1 to 0.4 μm. Therefore, the thin-film magnetic head in this embodiment has the same advantages as those in the thin-film magnetic head 1 in the first embodiment.

In order to form the pole section 51, in the step of forming the Gd-defining layer 4, as shown in FIG. 19, the width W of each of the extending sections 4a and 4b of the Gd-defining layer 4 is set at 1 μm. When the pole section 51 is subjected to the ion milling described above, both sides of the lower pole layer 5 and both sides of the gap layer 6 can be etched substantially uniformly.

In accordance with the thin-film magnetic head in the second embodiment, the same as the thin-film magnetic head 1 in the first embodiment, the pole section 51 can write information in the magnetic disk with a narrower track width Tw than the conventional thin-film magnetic head.

Figure 21:
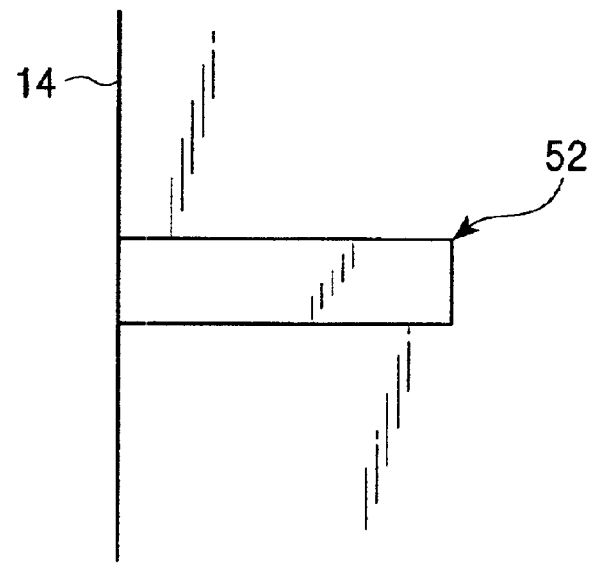
FIG. 21 is a partial plan view showing a pole section of a thin-film magnetic head in a third embodiment of the present invention.
Figure 22:
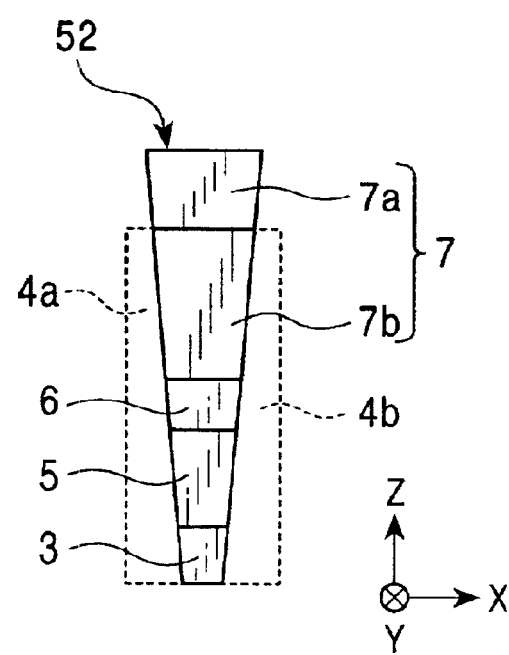
FIG. 22 is a partial front view showing a state in which both sides of the pole section shown in FIG. 21 is polished.

Next, a third embodiment will be described with reference to FIGS. 21 and 22. FIG. 21 is a partial plan view showing a pole section of a thin-film magnetic head in the third embodiment of the present invention, and FIG. 22 is a partial front view of the pole section of the thin-film magnetic head in the third embodiment. The thin-film magnetic head in the third embodiment is the same as the thin-film magnetic head 1 in the first embodiment except for a pole section 52.

The pole section 52 of the thin-film magnetic head in the third embodiment includes a lower pole layer 5, a gap layer 6, and an upper pole layer 7 formed on a plating underlayer 3, the same as the pole section 13 in the first embodiment.

In the pole section 52, as shown in FIG. 22, when viewed from the surface 14 facing the medium, the width in the track width direction (in the direction of the X-axis in the drawing) of the lower pole layer 5 gradually decreases with distance from the gap layer 6 in the thickness direction of the lower pole layer 5. The width in the track width direction of the upper pole layer 7 gradually increases with distance from the gap layer 6. In the thin-film magnetic head in this embodiment, the maximum width in the track width direction of the gap layer 6 can be set at 0.4 μm or less, for example, approximately 0.1 to 0.4 μm. Therefore, the thin-film magnetic head in this embodiment has the same advantages as those of the thin-film magnetic head in the first embodiment.

In order to form the pole section 52, in the step of forming the Gd-defining layer 4, as shown in FIG. 21, a GD-defining layer 4 having an appropriate length in the track width direction is formed and both extending sections of the Gd-defining layer 4 (not shown in the drawing) are etched by $O_2$ ashing, RIE, or the like, using the pole section 52 as a mask, so as to be substantially completely removed. The ion milling described above is then performed on the pole section 52, and thereby, when viewed from the surface 14 facing the medium, the lower pole layer 5 and the gap layer 6 are etched as shown in FIG. 22, and the width in the track width direction of the lower pole layer 5 gradually decreases with distance from the gap layer 6 in the thickness direction of the lower pole layer 5. The width in the track width direction of the upper pole layer 7 gradually increases with distance from the gap layer 6 in the thickness direction of the upper pole layer 7.

In accordance with the thin-film magnetic head in the third embodiment, the same as the thin-film magnetic head 1 in the first embodiment, the pole section 52 can write information in a magnetic disk as the magnetic recording medium with a narrower track width Tw than the conventional thin-film magnetic head.

In the thin-film magnetic head in the first embodiment, since the lower pole layer 5 can be formed with a larger volume compared to the thin-film magnetic head in the second embodiment, magnetic saturation is not easily caused, and a thin-film magnetic head with a superior overwrite characteristic which achieves a higher recording density can be obtained.

In comparison with the conventional thin-film magnetic head 21, with respect to the thin-film magnetic head in the first embodiment or the thin-film magnetic head in the second embodiment, in the step of forming the Gd-defining layer, by setting the width of each of the extending sections of the Gd-defining layer at 4 μm or less, the region of the pole section with the narrowest width moves to the gap layer. Therefore, by setting each of the extending sections of the Gd-defining layer extending at both sides of the pole section at a predetermined width, the track width Tw can be adjusted.

When the thin-film magnetic head in the first embodiment is compared to the thin-film magnetic head in the third embodiment, and when the thin-film magnetic head in the second embodiment is compared to the thin-film magnetic head in the third embodiment, since the lower pole layer 5 can be formed with a larger volume in the thin-film magnetic head in the first or second embodiment compared to the thin-film magnetic head in the third embodiment, magnetic saturation is not easily caused, and a thin-film magnetic head in which write fringing is avoided and which achieves a higher recording density can be obtained.

Therefore, in view of writing sufficient information in the magnetic disk, the width W of each of the extending sections of the Gd-defining layer is preferably set in the range of 1 to 4 μm before performing etching, such as ion milling. Consequently, when the etching, such as the ion milling, is performed, the width W of each of the extending sections of the Gd-defining layer 4 is slightly etched and results in, for example, in the range of 0.5 to 4 μm.

As described above, in the thin-film magnetic head of the present invention, the track width Tw which is narrower than the lower limit of the resolution by photolithography, i.e., the resolution of the resist for exposure and development, and thus high density magnetic recording can be performed.

EXAMPLE

In this example, a thin-film magnetic head which is the same as that described in the first embodiment was fabricated. The method for fabricating the thin-film magnetic head was the same as that described in the first embodiment.

In this example, the relationship between ion irradiation and the etching rate at given points was checked. As shown in FIG. 9, the width in the pole section 13 is substantially restricted to a predetermined length by the width T of the recess 17a. In this example, the width T was in the range of 0.55 to 0.6 μm. The height of the recess 17a was in the range of 4 to 4.2 μm.

Next, the pole section 13 was formed as shown in FIGS. 11 and 12, and the resist layer 17 was removed, followed by ion irradiation at the ion irradiation angle θ2.

Figure 23:
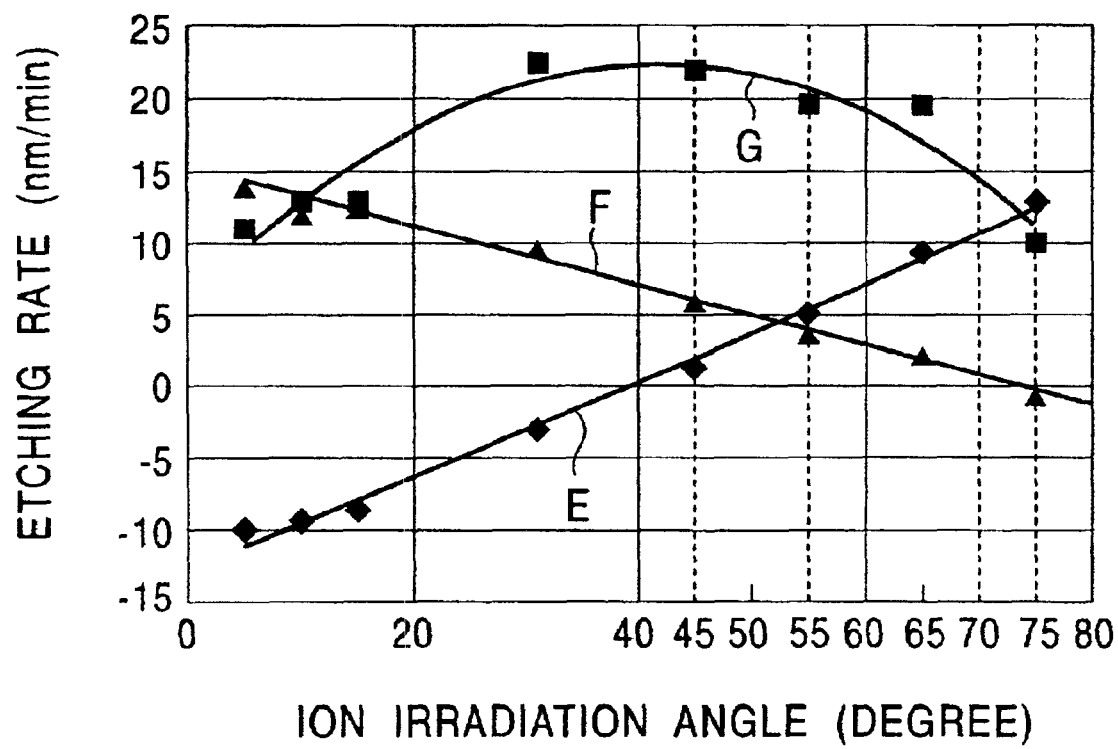
FIG. 23 is a graph showing the relationship between the etching rate and the ion irradiation angle θ2.

FIG. 23 is a graph showing the relationships between the ion irradiation angle θ2 and the etching rate with respect to the etching rate at the sides of the pole section, the etching rate at the upper surface of the upper pole layer, and the etching rate at the upper surface of the lower core layer at both sides of the pole section.

As shown in FIG. 23, as the ion irradiation angle θ2 is increased, the etching rate E at the sides 13a and 13b of the pole section 13 is linearly increased. The etching rate E at the sides 13a and 13b is negative at the ion irradiation angle θ2 in the range of 0° to 40°, which indicates the redeposition by ion milling. Since the etching rate must be positive to etch the sides of the pole section 13, the ion irradiation angle θ2 must be 40° or more.

As shown in FIG. 23, the etching rate G at the upper surface of the upper pole layer is highest at the ion irradiation angle θ2 in the range of 40° to 45°, and as the ion irradiation angle θ2 increases from 45°, the etching rate G is gradually decreased.

The etching rate G is positive at any ion irradiation angle θ2, and the upper surface of the upper pole layer 7 is etched. Since an upper pole layer must have a sufficient volume in order to avoid magnetic saturation, preferably, the upper surface of the upper pole layer 7 is less etched.

The etching rate F at the upper surface of the lower core layer at both sides of the pole section decreases linearly as the ion irradiation angle θ2 is increased. In particular, when the ion irradiation angle θ2 is 75° or more, the etching rate F is negative. If the etching rate F is negative, magnetic dust etched from the pole section 13 adheres to the upper surface of the lower core layer, resulting in write fringing from the upper pole layer, etc.

Consequently, in this embodiment, the ion irradiation angle θ2 was set in the range of 45° to 75°. By setting the ion irradiation angle θ2 in the range of 45° to 75°, the etching rate E at the sides 13a and 13b was positive, and etching was performed appropriately. The width in the track width direction of the pole section 13 was 0.4 μm or less.

When the ion irradiation angle θ2 was approximately in the range of 40° to 45°, the etching rate G at the upper surface of the upper pole layer 7 was highest, which was undesirable, and therefore, the ion irradiation angle θ2 was set at 45° or more. In this example, the height of the pole section 13 was 3.3 to 3.5 μm.

By setting the ion irradiation angle θ2 in the range of 45° to 75°, the etching rate F at the upper surface of the lower core layer 2 at both sides in the track width direction of the pole section 13 was positive, and no redeposition occurred, and also the angle θ1 of inclination of the upper surface 40b of the lower core layer 2 can be set at 2° to 10°.

Furthermore, in this example, it has been found that by setting the ion irradiation angle θ2 at 55° to 70°, the etching rate E at the sides 13a and 13b of the pole section 13 and the etching rate F at the upper surface of the lower core layer 2 at both sides of the pole section 13 are positive and appropriate etching is enabled. Since the ion irradiation angel θ2 is 45° or more and the etching rate G at the upper surface of the upper pole layer 7 is low, the amount of etching is small, and the volume of the upper pole layer can be increased. Thereby, the volume of the upper pole layer 7 can be increased, and it is possible to form a structure in which the upper pole layer 7 is not easily saturated.

In this example, the etching step was performed at the ion irradiation angle θ2 of 70°. Consequently, the pole section of the thin-film magnetic head in this example was the same as that shown in FIG. 1 when viewed from the surface facing the medium. The track width Tw was 0.2 μm.

What is claimed is:

1. A thin-film magnetic head comprising:

a lower core layer;

a gap layer formed on the lower core layer, with a lower pole layer therebetween;

an upper pole layer formed on the gap layer;

an upper core layer formed on the upper pole layer; and a Gd-defining layer for defining a depth in a height direction of a joint surface between the gap layer and the upper pole layer, the Gd-defining layer being formed on the lower core layer in the height direction from a surface facing a recording medium, wherein a width in a track width direction of the gap layer is smaller than a width in the track width direction of the upper pole layer when viewed from the surface facing the recording medium, wherein the width in the track width direction of the gap layer is less than 0.4 µm when viewed from the surface facing the medium.

2. A thin-film magnetic head according to claim 1, wherein the width in the track width direction of the gap layer is smaller than or equal to the width in the track width direction of the lower pole layer when viewed from the surface facing the medium.

3. A thin-film magnetic head according to claim 1, wherein the width in the track width direction of the lower pole layer is substantially equal to the width in the track width direction of the gap layer when viewed from the surface facing the medium.

4. A thin-film magnetic head according to claim 1, wherein the thickness of the lower pole layer is in the range of 0.25 to 0.5 µm.

5. A thin-film magnetic head according to claim 1, wherein the Gd-defining layer extends from both sides of a pole section comprising the gap layer, the upper pole layer, and the lower pole layer, and each of the extending sections of the Gd-defining layer has a width of 1 to 4 µm.

6. A thin-film magnetic head comprising:

a lower core layer;

a gap layer formed on the lower core layer;

an upper pole layer formed on the gap layer;

an upper core layer formed on the upper pole layer; and a Gd-defining layer for defining the depth in the height direction of the joint surface between the gap layer and the upper pole layer, the Gd-defining layer being formed on the lower core layer in the height direction from a surface facing a recording medium, wherein a width in a track width direction of the gap layer is smaller than a width in the track width direction of the upper pole layer when viewed from the surface facing the medium;

wherein the width in the track width direction of the gap layer is less than 0.4 µm when viewed from the surface facing the medium.

* * * * *